US008637206B2

(12) United States Patent
Imai et al.

(10) Patent No.: US 8,637,206 B2
(45) Date of Patent: Jan. 28, 2014

(54) CATALYST, PRODUCTION PROCESS THEREFOR AND USE THEREOF

(75) Inventors: Takuya Imai, Chiba (JP); Ryuji Monden, Chiba (JP); Toshikazu Shishikura, Chiba (JP)

(73) Assignee: Showa Denko K.K., Tokyo (JP)

( * ) Notice: Subject to any disclaimer, the term of this patent is extended or adjusted under 35 U.S.C. 154(b) by 17 days.

(21) Appl. No.: 13/122,689

(22) PCT Filed: Oct. 6, 2009

(86) PCT No.: PCT/JP2009/067374
§ 371 (c)(1),
(2), (4) Date: Apr. 5, 2011

(87) PCT Pub. No.: WO2010/041639
PCT Pub. Date: Apr. 15, 2010

(65) Prior Publication Data
US 2011/0189583 A1 Aug. 4, 2011

(30) Foreign Application Priority Data

Oct. 6, 2008 (JP) ................................. 2008-259777

(51) Int. Cl.
*H01M 8/10* (2006.01)
(52) U.S. Cl.
USPC ......................................... 429/482; 429/479
(58) Field of Classification Search
USPC ....................................................... 429/482
See application file for complete search history.

(56) References Cited

U.S. PATENT DOCUMENTS

| 3,492,100 | A | * | 1/1970 | Paris et al. ..................... 423/365 |
| 4,581,289 | A | * | 4/1986 | Dietrich et al. ............... 428/379 |
| 5,811,624 | A | * | 9/1998 | Hantzer et al. ................ 585/700 |
| 7,767,330 | B2 | | 8/2010 | Merzougui et al. |
| 2011/0059386 | A1 | * | 3/2011 | Monden et al. ............... 429/483 |

FOREIGN PATENT DOCUMENTS

| CN | 101171712 A | 4/2008 |
| JP | 2003-012375 A | 1/2003 |
| JP | 2003-342058 A | 12/2003 |
| JP | 2006-107967 A | 4/2006 |
| JP | 2006-134603 A | 5/2006 |
| JP | 2007-031781 A | 2/2007 |
| JP | 2007-257888 A | 10/2007 |
| JP | 2008-108594 A | 5/2008 |

OTHER PUBLICATIONS

Cava et al., "Antiferromagnetism and metallic conductivity in $Nd_{12}O_{29}$", Nature, Apr. 18, 1991, vol. 350, pp. 598-600.

(Continued)

*Primary Examiner* — Barbara Gilliam
*Assistant Examiner* — Gary Harris
(74) *Attorney, Agent, or Firm* — Sughrue Mion, PLLC

(57) ABSTRACT

The invention provides catalysts which are not corroded in acidic electrolytes or at high potential and have excellent durability and high oxygen reducing ability. The catalysts include a niobium-containing oxycarbonitride having $I_2/(I_1+I_2)$ of not less than 0.25 wherein $I_1$ is the maximum X-ray diffraction intensity at diffraction angles 2θ of 25.45 to 25.65 degrees and $I_2$ is the maximum X-ray diffraction intensity at diffraction angles 2θ=2θ of 25.65 to 26.0 degrees according to X-ray powder diffractometry (Cu—Kα radiation).

11 Claims, 14 Drawing Sheets

(56) References Cited

OTHER PUBLICATIONS

K. Nam, et al., "Oxygen reduction catalyst performance of partially oxidized niobium carbonitride as cathode catalyst for PEFC," The Electrochemical Society of Japan Dai, Kai Taikai Koen Yoshishu, Mar. 29, 2009, pp. 499, vol. 76, Partial English Translation.

Kyung Don Nam, et al., "Partially Oxidized Niobium Carbonitride as Non-Platinum Cathode for PEFC," Electrochem Solid-State Lett, 2009, pp. B158-B160, vol. 12, No. 11.

Chinese Office Action issued in corresponding Chinese Application No. 200980139301.X dated Sep. 5, 2012.

* cited by examiner

US 8,637,206 B2

CATALYST, PRODUCTION PROCESS THEREFOR AND USE THEREOF

CROSS REFERENCE TO RELATED APPLICATION

This application is a National Stage of International Application No. PCT/JP2009/067374 filed Oct. 6, 2009, claiming priority based on Japanese Patent Application No. 2008-259777, filed Oct. 6, 2008, the contents of all of which are incorporated herein by reference in their entirety.

TECHNICAL FIELD

The present invention relates to catalysts, processes for producing the same, and uses of the catalysts.

BACKGROUND ART

Fuel cells are classified into several types according to the electrolytes or electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. attract attention and are progressively developed and practically used as power sources for low pollution automobiles. The polymer electrolyte fuel cells are expected to be used as automobile drive sources or stationary power sources. The use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in fuel cells and enhance the energy conversion efficiency, a layer containing a catalyst (hereinafter, also the fuel cell catalyst layer) is conventionally provided on the surface of a cathode (an air electrode) or an anode (a fuel electrode) of fuel cells.

Here, noble metals are generally used as the catalysts. Of the noble metals, platinum that is stable at high potential and has high activity is most frequently used. However, since platinum is expensive and exists in a limited amount, alternative catalysts have been desired.

Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing ability.

Materials containing nonmetals such as carbon, nitrogen and boron have captured attention as alternative catalysts to platinum. The materials containing these nonmetals are inexpensive compared to noble metals such as platinum and are abundant. Universities and research institutes are studying the application of the materials in various fields.

For example, Patent Literature 1 discloses an oxycarbonitride obtained by mixing a carbide, an oxide and a nitride and heating the mixture in vacuum or an inert or non-oxidative atmosphere at 500 to 1500° C. However, the oxycarbonitride disclosed in Patent Literature 1 is a thin-film magnetic head ceramic substrate material, and the use of the oxycarbonitride as catalyst is not considered therein.

Patent Literature 2 discloses, as platinum-alternative materials, oxygen-reducing electrode materials containing a nitride of one or more elements selected from Groups 4, 5 and 14 in the long periodic table. However, the materials containing these nonmetals do not provide sufficient oxygen reducing ability for practical use as catalysts.

Nonpatent Literature 1 discloses a process for producing $Nb_{12}O_{29}$ by reducing $Nb_2O_5$. However, Nonpatent Literature 1 describes $Nb_{12}O_{29}$ as an antiferromagnetic and conductive material, and does not consider it as an oxygen reducing catalyst for fuel cells.

CITATION LIST

Patent Literatures

Patent Literature 1: JP-A-2003-342058
Patent Literature 2: JP-A-2007-31781

Nonpatent Literature

Nonpatent Literature 1: R. J. Cava, B. Batlogg, J. J. Krajewski, P. Gammel, H. F. Poulsen, W. F. Peck Jr & L. W. Rupp Jr, Antiferromagnetism and metallic conductivity in $Nb_{12}O_{29}$, Nature, 1991, vol. 350, p. 598-600

SUMMARY OF INVENTION

Technical Problem

The present invention is aimed at solving the problems in the background art as described above. It is therefore an object of the invention to provide catalysts that are not corroded in acidic electrolytes or at high potential and have excellent durability and high oxygen reducing ability.

Solution to Problem

The present inventors studied diligently to solve the problems in the art described hereinabove. They have then found that catalysts which are formed of a niobium-containing oxycarbonitride showing a specific X-ray diffractometry peak pattern, in particular catalysts which are formed of an oxycarbonitride obtained by oxidizing a niobium-containing carbonitride under specific conditions, have high oxygen reducing ability. The present invention has been completed based on the finding. $Nb_{12}O_{29}$ produced by the process of Nonpatent Literature 1 does not have sufficient oxygen reducing ability for practical use as oxygen reducing catalysts for fuel cells.

For example, the present invention is concerned with the following (1) to (13).

(1) A catalyst which comprises a niobium-containing oxycarbonitride having $I_2/(I_1+I_2)$ of not less than 0.25 wherein $I_1$ is the maximum X-ray diffraction intensity at diffraction angles $2\theta$ of 25.45° to 25.65° and $I_2$ is the maximum X-ray diffraction intensity at diffraction angles $2\theta$ of 25.65° to 26.0° according to X-ray powder diffractometry (Cu—Kα radiation).

(2) The catalyst as described in (1), wherein the niobium-containing oxycarbonitride has a compositional formula represented by $NbC_xN_yO_z$ (wherein x, y and z represent a ratio of the numbers of the atoms, $0.01 \leq x \leq 2$, $0.01 \leq y \leq 2$, $0.01 \leq z \leq 3$, and $x+y+z \leq 5$).

(3) The catalyst as described in (1), wherein the niobium-containing oxycarbonitride contains, in addition to niobium, at least one metal (hereinafter the "metal M" or "M") selected from the group consisting of tin, indium, platinum, tantalum, zirconium, copper, iron, tungsten, chromium, molybdenum, hafnium, titanium, vanadium, cobalt, manganese, cerium, gold, silver, iridium, palladium, yttrium, ruthenium and nickel.

(4) The catalyst as described in (3), wherein the niobium-containing oxycarbonitride has a compositional formula represented by $Nb_aM_bC_xN_yO_z$ (wherein M is the metal M, a, b, x, y and z represent a ratio of the numbers of the atoms, $0.01 \le a < 1$, $0 < b \le 0.99$, $0.01 \le x \le 2$, $0.01 \le y \le 2$, $0.01 \le z \le 3$, $a+b=1$, and $x+y+z \le 5$).

(5) A process for producing the catalysts of any one of (1) to (4), which comprises a step of obtaining the niobium-containing oxycarbonitride by heating a niobium-containing carbonitride in an inert gas containing oxygen gas.

(6) The process for producing the catalysts described in (5), wherein the heating is performed at a temperature in the range of 600 to 1200° C. and the inert gas has an oxygen gas concentration in the range of 0.1 to 5% by volume.

(7) The process for producing the catalysts described in (5) or (6), wherein the inert gas contains hydrogen gas at not more than 4% by volume.

(8) A fuel cell catalyst layer comprising the catalyst described in any one of (1) to (4).

(9) The fuel cell catalyst layer as described in (8), further comprising electron conductive particles.

(10) An electrode comprising a fuel cell catalyst layer and a porous support layer, wherein the fuel cell catalyst layer is the fuel cell catalyst layer described in (8) or (9).

(11) A membrane electrode assembly comprising a cathode, an anode and an electrolyte membrane interposed between the cathode and the anode, wherein the cathode and/or the anode is the electrode described in (10).

(12) A fuel cell comprising the membrane electrode assembly described in (11).

(13) A polymer electrolyte fuel cell comprising the membrane electrode assembly described in (11).

Advantageous Effects of Invention

The catalysts according to the invention are stable and are not corroded in acidic electrolytes or at high potential, have high oxygen reducing ability and are inexpensive compared to platinum. The fuel cells having the catalysts are therefore relatively inexpensive and have high performance.

DESCRIPTION OF EMBODIMENTS (Catalysts)

Figure 1:
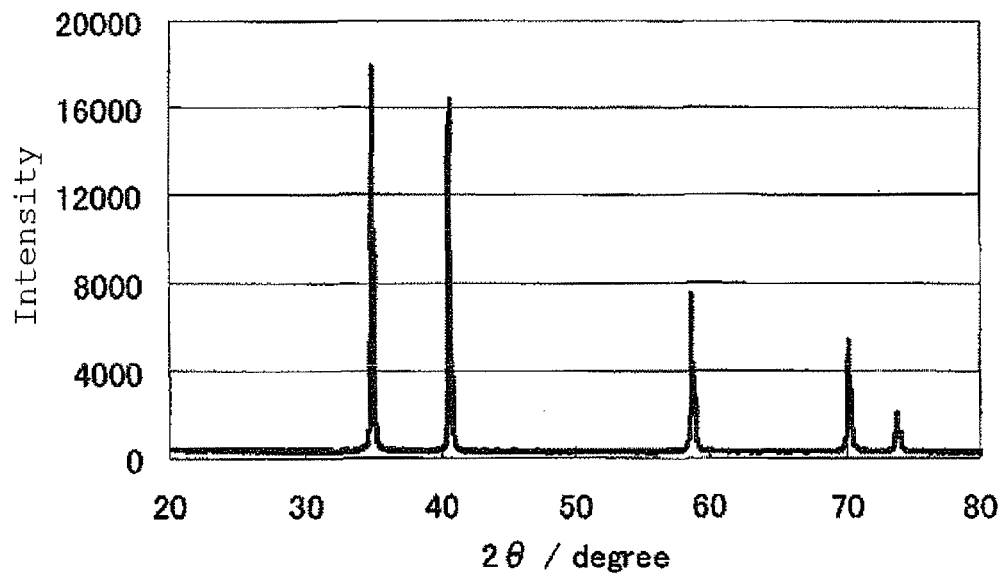
FIG. 1 is an X-ray powder diffraction spectrum of a niobium carbonitride (1) in Example 1.

Catalysts according to the invention include a niobium-containing oxycarbonitride having $I_2/(I_1+I_2)$ of not less than 0.25 wherein $I_1$ is the maximum X-ray diffraction intensity at diffraction angles 2θ of 25.45° to 25.65° and $I_2$ is the maximum X-ray diffraction intensity at diffraction angles 2θ of 25.65° to 26.0° according to X-ray powder diffractometry (Cu—Kα radiation). $I_2/(I_1+I_2)$ is preferably not less than 0.35, and more preferably not less than 0.4. The upper limit of $I_2/(I_1+I_2)$ is not particularly limited, but the ratio is not more than 1. When $I_2/(I_1+I_2)$ is in the above range, the obtainable catalysts formed of the niobium-containing oxycarbonitrides tend to achieve high oxygen reducing ability.

The diffraction peaks observed near a diffraction angle $2\theta=25.5°$ are assigned to the $Nb_2O_5$ skeletons (ICSD card: 00-037-1468), and the diffraction peaks that appear near a diffraction angle $2\theta=25.85°$ are assigned to the $Nb_{12}O_{29}$ skeletons (ICSD card: 01-073-1610). Accordingly, the proportion of the $Nb_{12}O_{29}$ skeletons in the niobium-containing oxycarbonitride is considered to increase with increasing $I_2/(I_1+I_2)$. The present inventors assume that the catalysts of the invention possess high oxygen reducing ability because of this high proportion of the $Nb_{12}O_{29}$ skeletons in the niobium-containing oxycarbonitride.

The diffraction peak is a peak that is observed at a specific diffraction angle and a specific diffraction intensity when a sample (crystal) is irradiated with X-rays at various angles. In the invention, the X-ray diffraction intensities I are defined to be values obtained by subtracting the intensity at the baseline from the diffraction intensity measured by the following method. (When the subtraction gives a negative value, the intensity is 0.) Here, the intensity at the baseline is the diffraction intensity at a diffraction angle $2\theta$ of $22.0°$.

The X-ray diffractometer may be X-ray powder diffractometer X'Pert Pro manufactured by PANalytical. The measurement conditions may be X-ray output: 45 kV, 40 mA, scan axis: $2\theta/\theta$, measurement angles ($2\theta$): $10°$ to $89.98°$, scan size: $0.017°$, scan step time: 10.3 sec, scan type: continuous, PSD mode: scanning, divergence slit (DS) type: fixed, irradiation width: 10 mm, measurement temperature: $25°$ C., target: Cu, K-Alpha 1: 1.54060, K-Alpha 2: 1.54443, K-Beta: 1.39225, K-A2/K-A1 ratio: 0.5, and goniometer radius: 240 mm.

The niobium-containing oxycarbonitride having the above $I_2/(I_1+I_2)$ may be obtained by, for example, heating a niobium-containing carbonitride in an inert gas containing oxygen gas. By controlling the heating conditions, the proportion of the $Nb_{12}O_{29}$ skeletons in the niobium-containing oxycarbonitride may be increased and the oxygen reducing ability of the final catalyst may be enhanced. The processes for producing the niobium-containing oxycarbonitrides will be described later.

The niobium-containing oxycarbonitride preferably has a compositional formula represented by $NbC_xN_yO_z$ (wherein x, y and z represent a ratio of the numbers of the atoms, $0.01 \leq x \leq 2$, $0.01 \leq y \leq 2$, $0.01 \leq z \leq 3$, and $x+y+z \leq 5$). In the compositional formula, it is more preferable that $0.1 \leq x \leq 1$, $0.1 \leq y \leq 1$, $0.1 \leq z \leq 2.9$, and $1 \leq x+y+z \leq 5$. This preferred ratio of the numbers of the atoms tends to lead to high oxygen reduction potential of the final catalysts.

The catalyst formed of the niobium-containing oxycarbonitride of the invention indicates either or both a compound represented by a compositional formula $NbC_xN_yO_z$ and a mixture which contains niobium-containing oxide, niobium-containing carbide, niobium-containing nitride, niobium-containing carbonitride, niobium-containing oxycarbide, niobium-containing oxynitride and the like and which is represented as a whole by a compositional formula $NbC_xN_yO_z$ (the mixture may not contain a compound represented by $NbC_xN_yO_z$). In particular, it is preferable that the content of the $Nb_{12}O_{29}$ skeletons having oxygen vacancies is high because the obtainable catalyst tends to have higher oxygen reducing ability.

The niobium-containing oxycarbonitride may contain, in addition to niobium, at least one metal (hereinafter the "metal M" or "M") selected from the group consisting of tin, indium, platinum, tantalum, zirconium, copper, iron, tungsten, chromium, molybdenum, hafnium, titanium, vanadium, cobalt, manganese, cerium, gold, silver, iridium, palladium, yttrium, ruthenium and nickel.

The oxycarbonitride that contains niobium and the metal M has a compositional formula represented by $Nb_aM_bC_xN_yO_z$ (wherein M is the metal M, a, b, x, y and z represent a ratio of the numbers of the atoms, $0.01 \leq a < 1$, $0 < b \leq 0.99$, $0.01 \leq x \leq 2$, $0.01 \leq y \leq 2$, $0.01 \leq z \leq 3$, $a+b=1$, and $x+y+z \leq 5$).

In the compositional formula, it is preferable that $0.05 \leq a \leq 0.99$, $0.01 \leq b \leq 0.95$, $0.01 \leq x \leq 2$, $0.01 \leq y \leq 2$, $0.05 \leq z \leq 3$, and $0.07 \leq x+y+z \leq 5$. When the ratio of the numbers of the atoms is in this range, the oxygen reduction potential tends to be increased.

In the compositional formula, it is more preferable that $0.50 \leq a \leq 0.99$, $0.01 \leq b \leq 0.50$, and $a+b=1$, and particularly preferably $0.80 \leq a \leq 0.99$, $0.01 \leq b \leq 0.20$, and $a+b=1$.

In the invention, the catalyst formed of the niobium-containing oxycarbonitride which further contains the metal M indicates either or both a compound represented by a compositional formula $Nb_aM_bC_xN_yO_z$ and a mixture which contains for example metal M oxide, metal M carbide, metal M nitride, metal M carbonitride, metal M oxycarbide, metal M oxynitride, niobium carbide, niobium oxide, niobium carbide, niobium nitride, niobium carbonitride, niobium oxycarbide, niobium oxynitride, oxide having the metal M and niobium, carbide having the metal M and niobium, nitride having the metal M and niobium, carbonitride having the metal M and niobium, oxycarbide having the metal M and niobium, and oxynitride having the metal M and niobium and which is represented as a whole by a compositional formula $Nb_aM_bC_xN_yO_z$ (the mixture may not contain a compound represented by $Nb_aM_bC_xN_yO_z$). In particular, it is preferable that the content of the $Nb_{12}O_{29}$ skeletons having oxygen vacancies is high because the obtainable catalyst tends to have higher oxygen reducing ability.

The oxygen reduction onset potential of the catalysts used in the invention is measured by the measurement method (A) described below.

[Measurement Method (A)]

The catalyst dispersed in electron conductive carbon particles is added to a solvent such that the catalyst and the carbon particles account for 1% by mass. The mixture is ultrasonically stirred to give a suspension. The carbon source herein is carbon black (specific surface area: 100-300 $m^2/g$) (e.g., XC-72 manufactured by Cabot Corporation), and the catalyst is dispersed therein with a catalyst: carbon mass ratio of 95:5. The solvent is a mixture of isopropyl alcohol:water=1:1 (by mass).

While ultrasonicating the suspension, a 10 µl portion thereof is collected and is quickly dropped on a glassy carbon electrode (diameter: 5.2 mm) and dried to form a fuel cell catalyst layer containing the catalyst on the glassy carbon electrode. The procedures for forming the catalyst layer are repeated until 2 mg of the catalyst layer is attached on the glassy carbon electrode.

Subsequently, 10 µl of NAFION (registered trademark) (a 5% NAFION (registered trademark) solution (DE521) manufactured by Du Pont Kabushiki Kaisha) diluted ten times with isopropyl alcohol is dropped on the fuel cell catalyst layer and is dried at $60°$ C. for 1 hour.

The electrode manufactured above is polarized in a 0.5 mol/$dm^3$ sulfuric acid solution at $30°$ C. under an oxygen atmosphere or a nitrogen atmosphere at a potential scanning rate of 5 mV/sec, thereby recording current-potential curves. As a reference, a reversible hydrogen electrode is polarized in a sulfuric acid solution of the same concentration. In the current-potential curves, the potential at which the reduction current starts to differ by 0.2 μA/cm² or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

At a potential of less than 0.4 V (vs. NHE), the compound can exist stably but oxygen cannot be reduced sufficiently. Catalysts having such a low potential are not useful as fuel cell catalyst layers in membrane electrode assemblies for fuel cells.

(Catalyst Production Processes)

The catalysts described above may be produced by any processes without limitation. An exemplary production process may include a step of heating a niobium-containing carbonitride in an inert gas containing oxygen gas to produce a niobium-containing oxycarbonitride. The catalysts that are formed of the niobium-containing oxycarbonitride obtained by such production process satisfy the $I_2/(I_1+I_2)$ ratio and tend to show high oxygen reducing ability.

(Methods for Producing Niobium-Containing Carbonitrides)

The niobium-containing carbonitride used in the above step may be obtained by a method (I) in which a mixture containing niobium oxide and carbon is heated in a nitrogen atmosphere or a nitrogen-containing inert gas to give a niobium-containing carbonitride; a method (II) in which a mixture containing niobium carbide, niobium oxide and niobium nitride is heated in, for example, a nitrogen atmosphere to give a niobium-containing carbonitride; or a method (III) in which a mixture containing niobium carbide and niobium nitride is heated in, for example, a nitrogen atmosphere to give a niobium-containing carbonitride. Exemplary methods further include a method (IV) in which a mixture containing metal M oxide, niobium oxide and carbon is heated in a nitrogen atmosphere or a nitrogen-containing inert gas to give a niobium-containing carbonitride; a method (V) in which a mixture containing metal M oxide, niobium carbide and niobium nitride is heated in an inert gas such as nitrogen gas to give a niobium-containing carbonitride; a method (VI) in which a mixture containing metal M oxide, niobium carbide, niobium nitride and niobium oxide is heated in an inert gas such as nitrogen gas to give a niobium-containing carbonitride, and a method (VII) in which a mixture that contains a metal M-containing compound (for example, organic acid salt, chloride, carbide, nitride or complex), niobium carbide and niobium nitride is heated in an inert gas such as nitrogen gas to give a niobium-containing carbonitride. A method (VIII) may be adopted in which a mixture containing a combination of the materials in the methods (IV) to (VII) and other materials is heated in an inert gas such as nitrogen gas to give a niobium-containing carbonitride. In the invention, the production methods are not particularly limited, and any methods may be used as long as niobium-containing carbonitrides are obtained.

[Production Method (I)]

In the production method (I), a mixture containing niobium oxide and carbon is heated in a nitrogen atmosphere or a nitrogen-containing inert gas to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Examples of the niobium oxides as materials include NbO, NbO$_2$ and Nb$_2$O$_5$. Any niobium oxides may be used without limitation, and the obtainable niobium-containing carbonitrides prepared from the niobium oxides may be heated in an oxygen-containing inert gas to give niobium-containing oxycarbonitride catalysts having a high oxygen reduction onset potential and high activity.

Examples of the carbons as materials include carbon, carbon blacks, graphites, black leads, activated carbons, carbon nanotubes, carbon nanofibers, carbon nanohorns and fullerenes. The carbons preferably have smaller particle diameters. Such carbon particles have a larger specific surface area and react easily with the oxides. For example, carbon black (specific surface area: 100-300 m²/g, for example XC-72 manufactured by Cabot Corporation) may be suitably used.

Appropriate niobium-containing carbonitride may be produced by stoichiometrically controlling the molar ratio of the niobium oxide and the carbon depending on the valence of niobium such as the valence of two, four or five. For example, in the case of niobium (II) oxide, the molar ratio is preferably such that the carbon is used at 1 to 3 mol per 1 mol of the niobium oxide. In the case of niobium (IV) oxide, the molar ratio is preferably such that the carbon is used at 2 to 4 mol per 1 mol of the niobium oxide. In the case of niobium (V) oxide, the molar ratio is preferably such that the carbon is used at 3 to 9 mol per 1 mol of the niobium oxide. If the molar ratio exceeds the upper limit, niobium carbide tends to result. If the molar ratio is below the lower limit, niobium nitride tends to be formed.

[Production Method (II)]

In the production method (II), a mixture containing niobium carbide, niobium nitride and niobium oxide is heated in, for example, a nitrogen atmosphere to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Materials used herein are niobium carbide, niobium nitride and niobium oxide. Examples of the niobium carbides as materials include NbC. Examples of the niobium nitrides as materials include NbN. Examples of the niobium oxides as materials include NbO, NbO$_2$ and Nb$_2$O$_5$. Any niobium oxides may be used without limitation, and the obtainable niobium-containing carbonitrides prepared from the niobium oxide, niobium carbide and niobium nitride may be heated in an oxygen-containing inert gas to give niobium-containing oxycarbonitride catalysts having a high oxygen reduction onset potential and high activity.

Appropriate niobium-containing carbonitride may be produced by controlling the amounts (the molar ratio) of the niobium carbide, the niobium oxide and the niobium nitride. The amounts (the molar ratio) are usually such that the niobium carbide and the niobium oxide are used at 0.01 to 500 mol and 0.01 to 50 mol, respectively, based on 1 mol of the niobium nitride, and preferably such that the niobium carbide and the niobium oxide are used at 0.1 to 300 mol and 0.1 to 30 mol, respectively, based on 1 mol of the niobium nitride. This molar ratio tends to ensure that the obtainable niobium-containing carbonitride gives a niobium-containing oxycarbonitride having a high oxygen reduction onset potential and high activity.

[Production Method (III)]

In the production method (III), a mixture containing niobium carbide and niobium nitride is heated in, for example, a nitrogen atmosphere to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Examples of the niobium carbides as materials include NbC. Examples of the niobium nitrides as materials include NbN.

Appropriate niobium-containing carbonitride may be produced by controlling the amounts (the molar ratio) of the niobium carbide and the niobium nitride. The amounts (the molar ratio) are usually such that the niobium carbide is used at 0.01 to 500 mol, and preferably 0.01 to 300 mol based on 1 mol of the niobium nitride. This molar ratio tends to ensure that the obtainable niobium-containing carbonitride gives a niobium-containing oxycarbonitride having a high oxygen reduction onset potential and high activity.

[Production Method (IV)]

In the production method (IV), a mixture containing metal M oxide, niobium oxide and carbon is heated in a nitrogen atmosphere or a nitrogen-containing inert gas to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Examples of the metal M oxides as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, gold oxide, silver oxide, iridium oxide, palladium oxide, yttrium oxide, ruthenium oxide and nickel oxide. One or more metal M oxides may be used.

Examples of the niobium oxides as materials include NbO, $NbO_2$ and $Nb_2O_5$.

Examples of the carbons as materials include carbon, carbon blacks, graphites, black leads, activated carbons, carbon nanotubes, carbon nanofibers, carbon nanohorns and fullerenes. The carbons preferably have smaller particle diameters. Such carbon particles have a larger specific surface area and react easily with the oxides. For example, carbon black (specific surface area: 100-300 $m^2/g$, for example XC-72 manufactured by Cabot Corporation) may be suitably used.

The above materials may be used in any combinations, and the obtainable niobium-containing carbonitrides prepared from the metal M oxide, the niobium oxide and the carbon may be heated in an oxygen-containing inert gas to give niobium-containing oxycarbonitride catalysts having a high oxygen reduction onset potential and high activity.

Appropriate niobium-containing carbonitride may be produced by controlling the amounts (the molar ratio) of the metal M oxide, the niobium oxide and the carbon.

The amounts (the molar ratio) are usually such that the metal M oxide and the carbon are used at 0.01 to 10 mol and 1 to 10 mol, respectively, based on 1 mol of the niobium oxide, and preferably such that the metal M oxide and the carbon are used at 0.01 to 4 mol and 2 to 6 mol, respectively, based on 1 mol of the niobium oxide. This molar ratio tends to ensure that the obtainable niobium-containing carbonitride gives a niobium-containing oxycarbonitride having a high oxygen reduction onset potential and high activity.

[Production Method (V)]

In the production method (V), a mixture containing metal M oxide, niobium carbide and niobium nitride is heated in an inert gas such as nitrogen gas to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Materials used herein are metal M oxide, niobium carbide and niobium nitride.

Examples of the metal M oxides as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, gold oxide, silver oxide, iridium oxide, palladium oxide, yttrium oxide, ruthenium oxide and nickel oxide. One or more metal M oxides may be used.

Examples of the niobium carbides as materials include NbC. Examples of the niobium nitrides as materials include NbN.

The above materials may be used in any combinations, and the obtainable niobium-containing carbonitrides prepared from the metal M oxide, the niobium carbide and the niobium nitride may be heated in an oxygen-containing inert gas to give niobium-containing oxycarbonitride catalysts having a high oxygen reduction onset potential and high activity.

Appropriate niobium-containing carbonitride may be produced by controlling the amounts (the molar ratio) of the metal M oxide, the niobium carbide and the niobium nitride. The amounts (the molar ratio) are usually such that the niobium carbide and the metal M oxide are used at 0.01 to 500 mol and 0.01 to 50 mol, respectively, based on 1 mol of the niobium nitride, and preferably such that the niobium carbide and the metal M oxide are used at 0.1 to 300 mol and 0.1 to 30 mol, respectively, based on 1 mol of the niobium nitride. This molar ratio tends to ensure that the obtainable niobium-containing carbonitride gives a niobium-containing oxycarbonitride having a high oxygen reduction onset potential and high activity.

[Production Method (VI)]

In the production method (VI), a mixture containing metal M oxide, niobium carbide, niobium nitride and niobium oxide is heated in an inert gas such as nitrogen gas to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Materials used herein are metal M oxide, niobium carbide, niobium nitride and niobium oxide.

Examples of the metal M oxides as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide, gold oxide, silver oxide, iridium oxide, palladium oxide, yttrium oxide, ruthenium oxide and nickel oxide. One or more metal M oxides may be used.

Examples of the niobium carbides as materials include NbC. Examples of the niobium nitrides as materials include NbN. Examples of the niobium oxides as materials include NbO, $NbO_2$ and $Nb_2O_5$.

The above materials may be used in any combinations, and the obtainable niobium-containing carbonitrides prepared from the metal M oxide, the niobium carbide, the niobium nitride and the niobium oxide may be heated in an oxygen-containing inert gas to give niobium-containing oxycarbonitride catalysts having a high oxygen reduction onset potential and high activity.

Appropriate niobium-containing carbonitride may be produced by controlling the amounts (the molar ratio) of the metal M oxide, the niobium carbide, the niobium nitride and the niobium oxide. The amounts (the molar ratio) are usually such that the niobium carbide is used at 0.01 to 500 mol and the metal M oxide and the niobium oxide are used together at 0.01 to 50 mol based on 1 mol of the niobium nitride, and preferably such that the niobium carbide is used at 0.1 to 300 mol and the metal M oxide and the niobium oxide are used together at 0.1 to 30 mol based on 1 mol of the niobium nitride. This molar ratio tends to ensure that the obtainable niobium-containing carbonitride gives a niobium-containing oxycarbonitride having a high oxygen reduction onset potential and high activity.

[Production Method (VII)]

In the production method (VII), a mixture that contains a metal M-containing compound, niobium carbide and niobium nitride is heated in an inert gas such as nitrogen gas to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

Materials used herein are a metal M-containing compound, niobium carbide and niobium nitride.

Examples of the metal M-containing compounds as materials include organic acid salts, carbonates, chlorides, organic complexes, carbides and nitrides of tin, indium, platinum, tantalum, zirconium, copper, iron, tungsten, chromium, molybdenum, hafnium, titanium, vanadium, cobalt, manganese, cerium, gold, silver, iridium, palladium, yttrium, ruthenium and nickel. One or more metal M-containing compounds may be used.

Examples of the niobium carbides as materials include NbC. Examples of the niobium nitrides as materials include NbN.

The above materials may be used in any combinations, and the obtainable niobium-containing carbonitrides prepared from the metal M-containing compound, the niobium carbide and the niobium nitride may be heated in an oxygen-containing inert gas to give niobium-containing oxycarbonitride catalysts having a high oxygen reduction onset potential and high activity.

Appropriate niobium-containing carbonitride may be produced by controlling the amounts (the molar ratio) of the metal M-containing compound, the niobium carbide and the niobium nitride. The amounts (the molar ratio) are usually such that the niobium carbide and the metal M-containing compound are used at 0.01 to 500 mol and 0.001 to 50 mol, respectively, based on 1 mol of the niobium nitride, and preferably such that the niobium carbide and the metal M-containing compound are used at 0.1 to 300 mol and 0.01 to 30 mol, respectively, based on 1 mol of the niobium nitride. This molar ratio tends to ensure that the obtainable niobium-containing carbonitride gives a niobium-containing oxycarbonitride having a high oxygen reduction onset potential and high activity.

[Production Method (VIII)]

Materials used herein are not particularly limited as long as the niobium-containing carbonitrides may be obtained. For example, the materials in the production methods (IV) to (VII) and other materials may be used in various combinations.

In the production method (VIII), a mixture of materials other than the combinations in the production methods (IV) to (VII) is heated in an inert gas such as nitrogen gas to give a niobium-containing carbonitride.

The heating temperature in the production of niobium-containing carbonitride is in the range of 600 to 1800° C., and preferably 800 to 1600° C. This heating temperature provides good crystallinity and homogeneity. Heating at temperatures below 600° C. tends to result in deteriorated crystallinity and homogeneity. Heating at temperatures above 1800° C. tends to result in easy sintering.

For example, materials used herein are mixtures that have various combinations of materials such as a metal M-containing compound, niobium carbide, niobium nitride, niobium oxide, niobium precursor and carbon.

Examples of the metal M-containing compounds as materials include organic acid salts, carbonates, chlorides, organic complexes, carbides, nitrides and precursors of tin, indium, platinum, tantalum, zirconium, copper, iron, tungsten, chromium, molybdenum, hafnium, titanium, vanadium, cobalt, manganese, cerium, gold, silver, iridium, palladium, yttrium, ruthenium and nickel. One or more metal M-containing compounds may be used.

Examples of the niobium carbides as materials include NbC. Examples of the niobium nitrides as materials include NbN. Examples of the niobium oxides as materials include NbO, $NbO_2$ and $Nb_2O_5$.

Examples of the niobium precursors include organic acid salts, carbonates, chlorides, organic complexes, carbides, nitrides and alkoxides containing niobium.

Examples of the carbons as materials include carbon, carbon blacks, graphites, black leads, activated carbons, carbon nanotubes, carbon nanofibers, carbon nanohorns and fullerenes. The carbons preferably have smaller particle diameters. Such carbon particles have a larger specific surface area and react easily with the oxides. For example, carbon black (specific surface area: 100-300 $m^2/g$, for example XC-72 manufactured by Cabot Corporation) may be suitably used.

The above materials may be used in any combinations, and the obtainable niobium-containing carbonitrides prepared therefrom may be heated in an oxygen-containing inert gas to give niobium-containing oxycarbonitride catalysts having a high oxygen reduction onset potential and high activity.

Appropriate niobium-containing carbonitride may be produced by controlling the amounts (the molar ratio) of, for example, the metal M-containing compound, the niobium carbide and the niobium nitride. The amounts (the molar ratio) are usually such that the niobium carbide and the metal M-containing compound are used at 0.01 to 500 mol and 0.001 to 50 mol, respectively, based on 1 mol of the niobium nitride, and preferably such that the niobium carbide and the metal M-containing compound are used at 0.1 to 300 mol and 0.01 to 30 mol, respectively, based on 1 mol of the niobium nitride. This molar ratio tends to ensure that the obtainable niobium-containing carbonitride gives a niobium-containing oxycarbonitride having a high oxygen reduction onset potential and high activity.

The niobium-containing carbonitrides obtained by the production methods (I) to (VIII) are preferably crushed. By the crushing, the obtainable catalyst can form finer particles and can be favorably dispersed in the formation of the catalyst layers. Further, the crushing increases the catalyst area and provides excellent catalytic ability.

The methods for crushing the niobium-containing carbonitrides include roll milling, ball milling, medium stirring milling, and crushing with an air flow crusher, a mortar or a crushing tank. To crush the niobium-containing carbonitrides into finer particles, an air flow crusher is preferably used. To facilitate the crushing in small amounts, the use of a mortar is preferable.

(Processes for Producing Niobium-Containing Oxycarbonitrides)

Next, there will be described a step of obtaining the niobium-containing oxycarbonitride by heating the niobium-containing carbonitride in an inert gas containing oxygen gas.

Examples of the inert gases include nitrogen gas, helium gas, neon gas, argon gas, krypton gas, xenon gas and radon gas. Nitrogen gas and argon gas are particularly preferable because of their relatively high availability.

The heating temperature is preferably in the range of 600 to 1200° C., and more preferably 700 to 1100° C. When the heating temperature is in this range, homogeneous niobium-containing oxycarbonitrides can be easily formed, and the niobium-containing oxycarbonitrides tend to have $Nb_2O_5$ skeletons at a low proportion and $Nb_{12}O_{29}$ skeletons at a high proportion. If the heating temperature is below 600° C., the oxidation tends not to proceed. Heating at a temperature above 1200° C. tends to result in excessive oxidation and increase the proportion of the $Nb_2O_5$ skeletons in the niobium-containing oxycarbonitrides.

The oxygen gas concentration in the inert gas depends on the heating time and the heating temperature, but is preferably 0.1 to 5% by volume, and more preferably 0.1 to 2% by volume. When the oxygen gas concentration in the inert gas is in this range, homogeneous niobium-containing oxycarbonitrides can be easily formed, and the niobium-containing oxycarbonitrides tend to have $Nb_2O_5$ skeletons at a low proportion and $Nb_{12}O_{29}$ skeletons at a high proportion. If the oxygen gas concentration is below 0.1% by volume, the oxidation tends to fail. If the concentration is in excess of 5% by volume, the oxidation tends to proceed excessively resulting in a higher proportion of the $Nb_2O_5$ skeletons in the niobium-containing oxycarbonitrides.

The inert gas preferably contains hydrogen gas at not more than 4% by volume. The content of the hydrogen gas depends on the heating time and the heating temperature, but is more preferably 0.01 to 4% by volume, and still more preferably 0.1 to 4% by volume. The presence of hydrogen gas at 4% by volume or above increases the risk of explosion, and therefore the concentration is more preferably less than 4% by volume. When the inert gas contains hydrogen gas in the above concentration, the obtainable final catalysts tend to achieve higher oxygen reducing ability. In the invention, the gas concentration (% by volume) is determined under standard conditions.

By controlling the above heating conditions, the proportion of the $Nb_{12}O_{29}$ skeletons in the niobium-containing oxycarbonitrides may be increased and the oxygen reducing ability of the final catalysts may be enhanced.

The heating methods include a stationary method, a stirring method, a dropping method and a powder capturing method.

In a stationary method, the niobium-containing carbonitride is placed in a stationary electric furnace or the like and heated therein. In an embodiment, the niobium-containing carbonitride may be weighed on an alumina board, a quartz board or the like, and the board carrying the carbonitride may be placed in a furnace to heat the carbonitride. The stationary methods have a benefit that large amounts of the niobium-containing carbonitrides can be heated.

In a stirring method, the niobium-containing carbonitride is placed in an electric furnace such as a rotary kiln and is heated with stirring. The stirring methods have advantages that large amounts of the niobium-containing carbonitrides can be heated and the aggregation and growth of particles of the niobium-containing carbonitrides can be prevented.

In a dropping method, an induction furnace is heated to a predetermined heating temperature while passing an inert gas containing a trace amount of oxygen gas through the furnace; a thermal equilibrium is maintained at the temperature and the niobium-containing carbonitride is dropped and heated in a crucible which is a heating zone in the furnace. The dropping methods have advantages that the aggregation and growth of particles of the niobium-containing carbonitrides can be minimized.

In a powder capturing method, the niobium-containing carbonitride is caused to suspend as particles in an inert gas atmosphere containing a trace amount of oxygen gas, and the niobium-containing carbonitride is captured and heated in a vertical tubular furnace maintained at a predetermined heating temperature.

In the dropping method, the heating time for the niobium-containing carbonitride is usually from 0.5 to 10 minutes, and preferably from 0.5 to 3 minutes. When the heating time is in this range, homogeneous niobium-containing oxycarbonitrides tend to be formed. Heating for less than 0.5 minute tends to result in partial formation of the niobium-containing oxycarbonitride. If the heating time exceeds 10 minutes, the oxidation tends to proceed excessively.

In the powder capturing method, the heating time for the niobium-containing carbonitride is from 0.2 second to 1 minute, and preferably from 0.2 to 10 seconds. When the heating time is in this range, homogeneous niobium-containing oxycarbonitrides tend to be formed. Heating for less than 0.2 second tends to result in partial formation of the niobium-containing oxycarbonitride. If the heating time exceeds 1 minute, the oxidation tends to proceed excessively.

When the heating is performed in a tubular furnace or a rotary kiln, the heating time for the niobium-containing carbonitride is from 0.1 to 20 hours, and preferably from 1 to 20 hours. When the heating time is in this range, homogeneous niobium-containing oxycarbonitrides tend to be formed. Heating for less than 0.1 hour tends to result in partial formation of the niobium-containing oxycarbonitride. If the heating time exceeds 20 hours, the oxidation tends to proceed excessively.

In the invention, the niobium-containing oxycarbonitrides obtained by the aforementioned processes may be used directly as the catalysts according to the invention. In another embodiment, the niobium-containing oxycarbonitride may be crushed into finer particles.

The methods for crushing the niobium-containing oxycarbonitrides include roll milling, ball milling, medium stirring milling, and crushing with an air flow crusher, a mortar or a crushing tank. To crush the niobium-containing oxycarbonitrides into finer particles, an air flow crusher is preferably used. To facilitate the crushing in small amounts, the use of a mortar is preferable.

<Uses>

The catalysts according to the present invention may be used as alternative catalysts to platinum catalysts.

For example, the catalysts may be used as fuel cell catalysts, exhaust gas treatment catalysts and organic synthesis catalysts.

Fuel cell catalyst layers according to the invention contain the above catalysts.

The fuel cell catalyst layers may be anode catalyst layers or cathode catalyst layers, and the catalysts of the invention may be used in any of these layers. Because the catalysts have excellent durability and high oxygen reducing ability, they are preferably used in cathode catalyst layers.

In a preferred embodiment, the fuel cell catalyst layer further contains electron conductive particles. When the fuel cell catalyst layer containing the catalyst further contains electron conductive particles, the reduction current may be further increased, probably because the electron conductive particles establish electrical contact points in the catalyst for inducing electrochemical reaction.

The electron conductive particles are generally used as a carrier for the catalyst.

Examples of the electron conductive particles include carbons, conductive polymers, conductive ceramics, metals and conductive inorganic oxides such as tungsten oxide and iridium oxide. These materials may be used singly or in combination with one another. In particular, since carbon has a large specific surface area, it is preferable to use single carbon or a mixture of carbon and other electron conductive particles. That is, the fuel cell catalyst layer according to a preferred embodiment contains the catalyst and carbon.

Examples of the carbons include carbon blacks, graphites, black leads, activated carbons, carbon nanotubes, carbon nanofibers, carbon nanohorns and fullerenes. If the particle diameter of carbon is excessively small, it tends to be difficult for the carbon to form an electron conductive path. If the particle diameter is excessively large, the fuel cell catalyst layer tends to reduce gas diffusion properties or the catalyst usage rate tends to be lowered. The carbon particle diameter is thus preferably in the range of 10 to 1000 nm, and more preferably 10 to 100 nm.

When the electron conductive particles are carbon, the mass ratio of the catalyst and the carbon (catalyst:electron conductive particles) is preferably in the range of 1:1 to 1000:1, more preferably 1:1 to 100:1, and still more preferably 1:1 to 20:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The fuel cell catalyst layer may further contain a common polymer electrolyte used in fuel cell catalyst layers without limitation. Specific examples include perfluorocarbon polymers having a sulfonic acid group (such as NAFION (registered trademark) (a 5% NAFION (registered trademark) solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, NAFION (registered trademark) (a 5% NAFION (registered trademark) solution (DE521) manufactured by Du Pont Kabushiki Kaisha) is preferable.

The fuel cell catalyst layers according to the present invention may be used as anode catalyst layers or cathode catalyst layers. The fuel cell catalyst layers contain the catalyst that has high oxygen reducing ability and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The catalyst may be dispersed on the electron conductive particles as carriers by methods such as airborne dispersion methods and in-liquid dispersion methods. The in-liquid dispersion methods are preferable because the dispersion of the catalyst and the electron conductive particles in a solvent may be used in the step of producing the fuel cell catalyst layers. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents and water are generally used.

When the catalyst is dispersed on the electron conductive particles, the electrolyte described above and a dispersant may be dispersed together.

The fuel cell catalyst layers may be formed by any methods without limitation. For example, a suspension containing the catalyst, the electron conductive particles and the electrolyte may be applied to an electrolyte membrane or a gas diffusion layer described later. The application methods include dipping, screen printing, roll coating and spraying. In another embodiment, a suspension containing the catalyst, the electron conductive particles and the electrolyte may be applied or filtered on a substrate to form a fuel cell catalyst layer, and the catalyst layer may be transferred to an electrolyte membrane.

Electrodes according to the present invention contain the fuel cell catalyst layer and a porous support layer.

The electrodes of the invention may be used as cathodes or anodes. The electrodes have excellent durability and high catalytic performance, and therefore the use thereof as cathodes is more effective.

The porous support layer is a layer which diffuses gas (hereinafter, also the gas diffusion layer). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

Membrane electrode assemblies of the invention have a cathode, an anode and an electrolyte membrane between the cathode and the anode. The cathode and/or the anode is the electrode as described hereinabove.

The electrolyte membranes may be general perfluorosulfonic acid electrolyte membranes or hydrocarbon electrolyte membranes. Further, microporous polymer membranes impregnated with liquid electrolyte, or porous membranes filled with polymer electrolyte may be used.

Fuel cells according to the present invention have the membrane electrode assemblies as described above.

The electrode reaction in fuel cells takes place at a three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the invention may be preferably used in polymer electrolyte fuel cells.

EXAMPLES

The present invention will be described in detail by presenting examples hereinbelow without limiting the scope of the invention.

In Examples and Comparative Examples, measurements were carried out by the following methods.

[Analytical Methods]

1. X-Ray Powder Diffractometry

Samples were analyzed by X-ray powder diffractometry using X'Pert Pro manufactured by PANalytical.

In the X-ray powder diffractometry of each sample, the number of diffraction peaks was counted in a manner such that a signal which was detected with a signal (S) to noise (N) ratio (S/N) of 2 or more was regarded as a diffraction peak. The X-ray diffraction intensity I was defined to be a value obtained by subtracting the intensity at the baseline from the diffraction intensity measured. (When the subtraction gave a negative value, the intensity was 0.) Here, the intensity at the baseline was the diffraction intensity at a diffraction angle $2\theta$ of $22.0°$.

2. Elemental Analysis

Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer (TC600) manufactured by LECO JAPAN CORPORATION.

Niobium and iron: Approximately 0.1 g of a sample was weighed on a platinum dish, and a nitric acid-hydrofluoric acid solution was added thereto. The sample was then thermally decomposed. The thermal decomposition product was collected to a predetermined volume, diluted and analyzed with ICP-MS (ICP-OES VISTA-PRO) manufactured by SII.

Example 1

1. Preparation of Catalyst 4.96 g (81 mmol) of niobium carbide (NbC manufactured by SOEKAWA CHEMICAL CO., LTD.), 1.25 g (10 mmol) of niobium oxide ($NbO_2$ manufactured by KOJUNDO CHEMICAL LABORATORY CO., LTD.) and 0.54 g (5 mmol) of niobium nitride (NbN manufactured by KOJUNDO CHEMICAL LABORATORY CO., LTD.) were sufficiently crushed and mixed together. The resultant powder mixture was heated in a tubular furnace in a nitrogen atmosphere at 1600° C. for 3 hours to give 2.70 g of a niobium carbonitride (1). Because the niobium carbonitride (1) would form a sintered product, it was crushed in a mortar.

Figure 2:
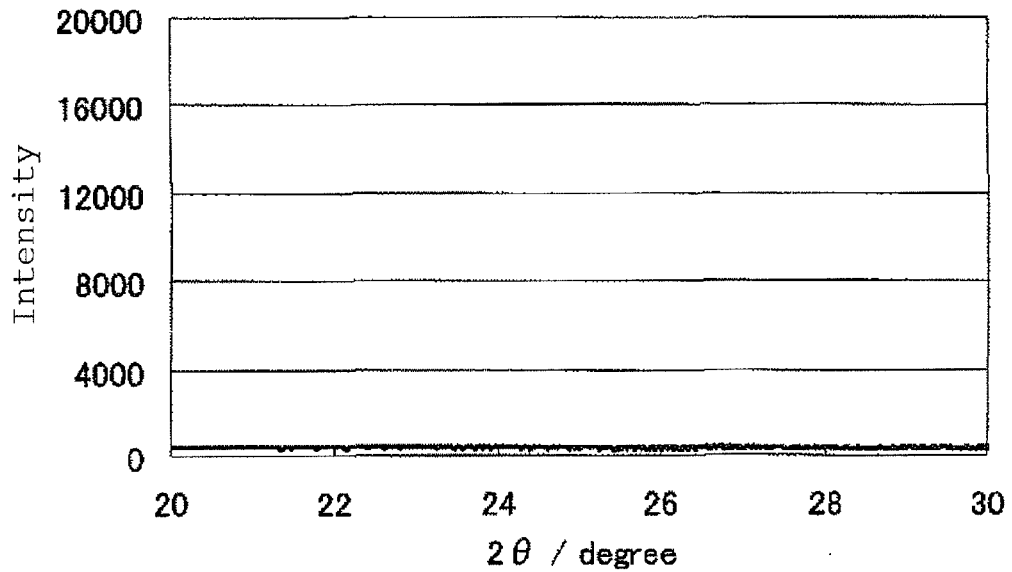
FIG. 2 is an enlarged view of the X-ray powder diffraction spectrum of the niobium carbonitride (1) in Example 1 at diffraction angles 2θ of 20° to 30°.

FIG. 1 shows an X-ray powder diffraction spectrum of the niobium carbonitride (1). FIG. 2 shows an enlarged view of the X-ray powder diffraction spectrum at diffraction angles $2\theta$ of $20°$ to $30°$. The results of the elemental analysis of the niobium carbonitride (1) are set forth in Table 1.

Subsequently, 0.50 g of the niobium carbonitride (1) was heated in a rotary kiln at 950° C. for 8 hours while passing equal amounts of an argon gas containing 1% by volume of oxygen gas and a nitrogen gas containing 4% by volume of hydrogen gas. As a result, a niobium-containing oxycarbonitride (hereinafter, also the catalyst (1)) was obtained.

Figure 3:
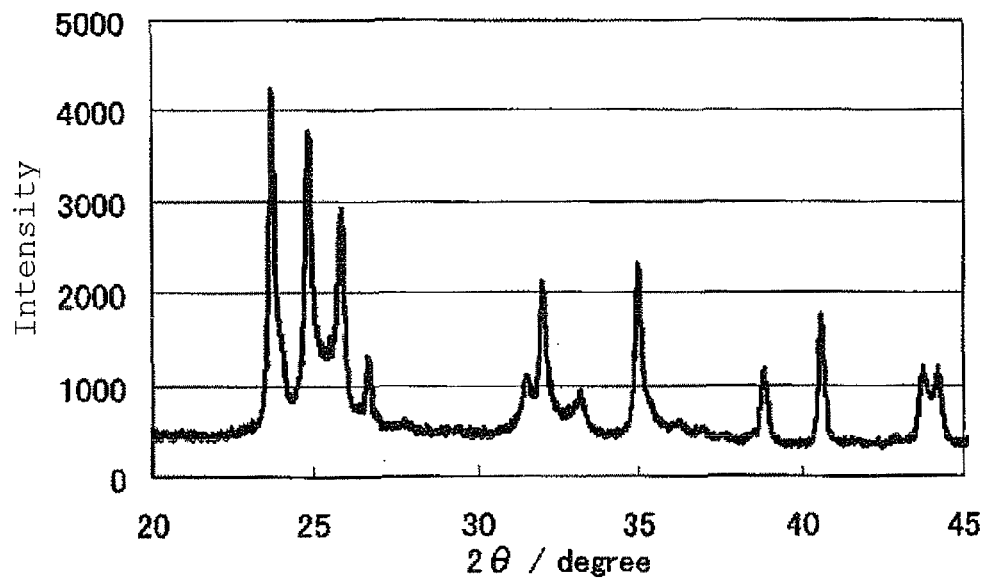
FIG. 3 is an X-ray powder diffraction spectrum of a catalyst (1) in Example 1.
Figure 4:
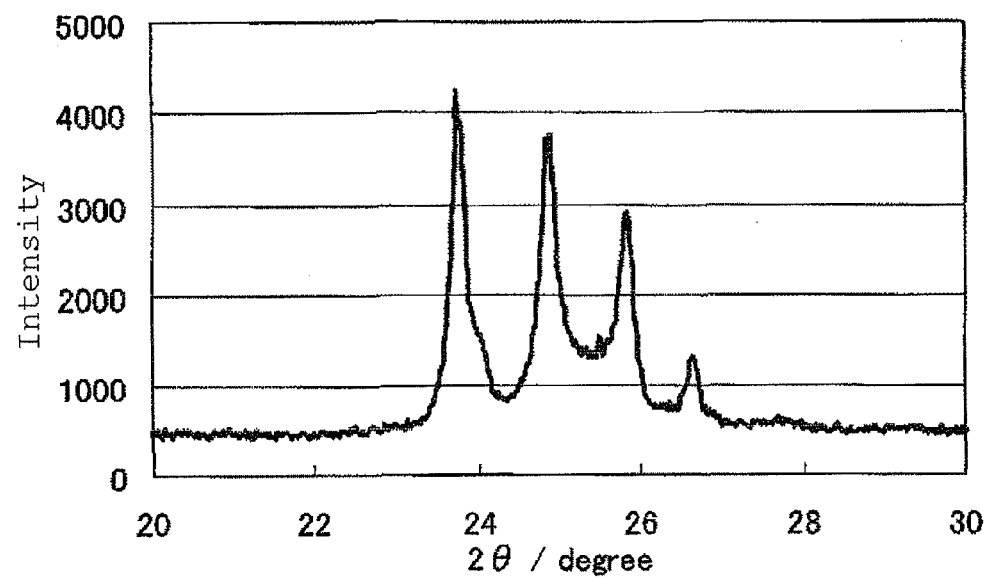
FIG. 4 is an enlarged view of the X-ray powder diffraction spectrum of the catalyst (1) in Example 1 at diffraction angles 2θ of 20° to 30°.

FIG. 3 shows an X-ray powder diffraction spectrum of the catalyst (1). FIG. 4 shows an enlarged view of the X-ray powder diffraction spectrum at diffraction angles $2\theta$ of $20°$ to $30°$. The X-ray powder diffraction spectrum indicated four diffraction peaks assigned to $Nb_{12}O_{29}$ skeletons between diffraction angles $2\theta$ of $23°$ to $28°$. The intensity at the baseline, namely, the X-ray diffraction intensity at a diffraction angle $2\theta$ of $22°$ was 466. The maximum X-ray diffraction intensity $I_1$ at diffraction angles $2\theta$ of $25.45°$ to $25.65°$ was 843. The maximum X-ray diffraction intensity $I_2$ at diffraction angles of $25.65°$ to $26.0°$ was 2456. The $I_2/(I_1+I_2)$ ratio was 0.74. The results of the elemental analysis of the catalyst (1) are set forth in Table 2.

2. Production of Fuel Cell Electrode

The oxygen reducing ability was determined in the following manner. The catalyst (1) in an amount of 0.02375 g and carbon (XC-72 manufactured by Cabot Corporation) weighing 0.00125 g were added to 2.5 g of a solution consisting of isopropyl alcohol:pure water=1:1 by mass. The mixture was ultrasonically stirred to give a suspended mixture. The mixture in a volume of 10 μl was applied on a glassy carbon electrode (diameter: 5.2 mm, manufactured by Tokai Carbon Co., Ltd.) and was dried. This procedure was repeated until 2 mg of a catalyst layer was formed on the electrode. Subsequently, 10 μl of NAFION (registered trademark) (a 5% NAFION (registered trademark) solution (DE521) manufactured by Du Pont Kabushiki Kaisha) diluted ten times with isopropyl alcohol was applied thereon and was dried at 60° C. for 1 hour. A fuel cell electrode (1) was thus manufactured.

3. Evaluation of Oxygen Reducing Ability

The fuel cell electrode (1) manufactured above was evaluated for catalytic ability (oxygen reducing ability) as described below.

The fuel cell electrode (1) was polarized in a 0.5 mol/dm³ sulfuric acid solution at 30° C. under an oxygen atmosphere or a nitrogen atmosphere at a potential scanning rate of 5 mV/sec, thereby recording current-potential curves. As a reference, a reversible hydrogen electrode was polarized in a sulfuric acid solution of the same concentration.

From the measurement results, the potential at which the reduction current started to differ by 0.2 μA/cm² or more between the polarization under the oxygen atmosphere and that under the nitrogen atmosphere was obtained as the oxygen reduction onset potential. The difference between the reduction currents was obtained as the oxygen reduction current.

The oxygen reducing ability of the fuel cell electrode (1) was evaluated based on the oxygen reduction onset potential and the oxygen reduction current. The higher the oxygen reduction onset potential and the higher the oxygen reduction current, the higher the oxygen reducing ability of the fuel cell electrode (1).

Figure 19:
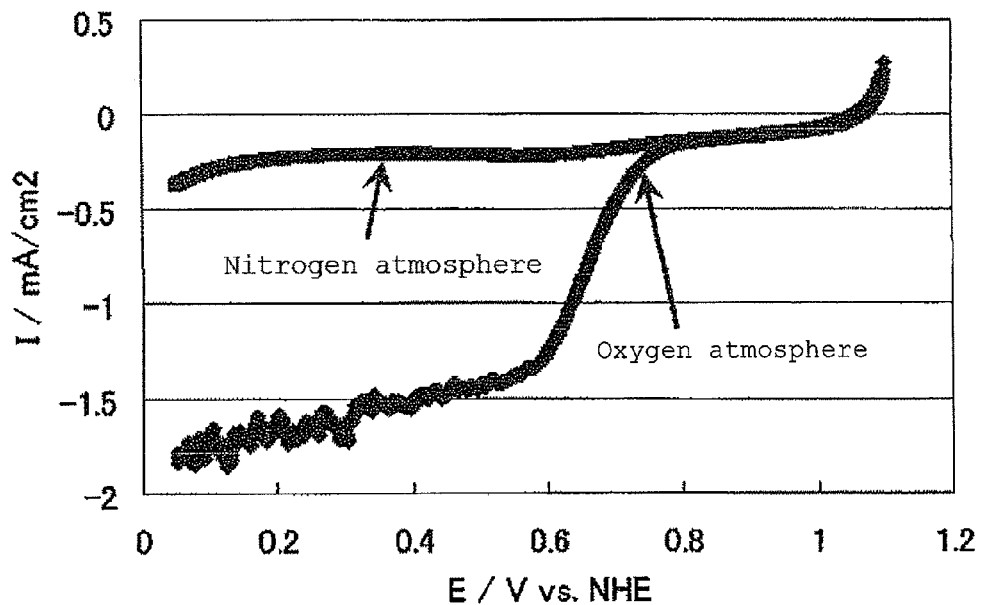
FIG. 19 is a graph showing an evaluation of the oxygen reducing ability of a fuel cell electrode (1) in Example 1.

The current-potential curves recorded during the above measurement are shown in FIG. 19.

The fuel cell electrode (1) manufactured in Example 1 had an oxygen reduction onset potential of 0.93 V (vs. NHE) and was found to have high oxygen reducing ability.

Example 2

1. Preparation of Catalyst

A niobium carbonitride (1) was prepared in the same manner as in Example 1. Subsequently, 0.50 g of the niobium carbonitride (1) was heated in a rotary kiln at 950° C. for 10 hours while passing equal amounts of an argon gas containing 1% by volume of oxygen gas and a nitrogen gas containing 4% by volume of hydrogen gas. As a result, a niobium-containing oxycarbonitride (hereinafter, also the catalyst (2)) was obtained.

Figure 5:
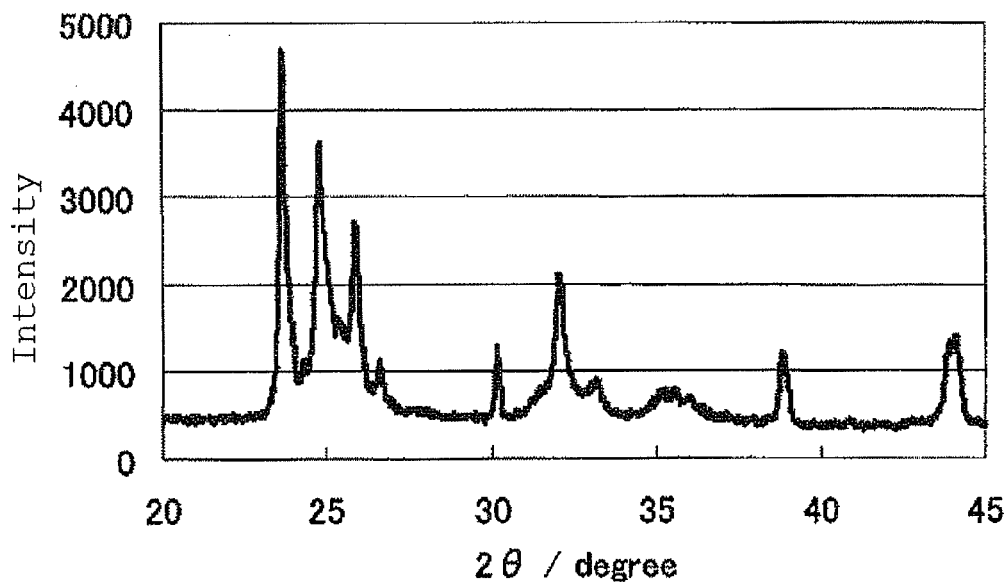
FIG. 5 is an X-ray powder diffraction spectrum of a catalyst (2) in Example 2.
Figure 6:
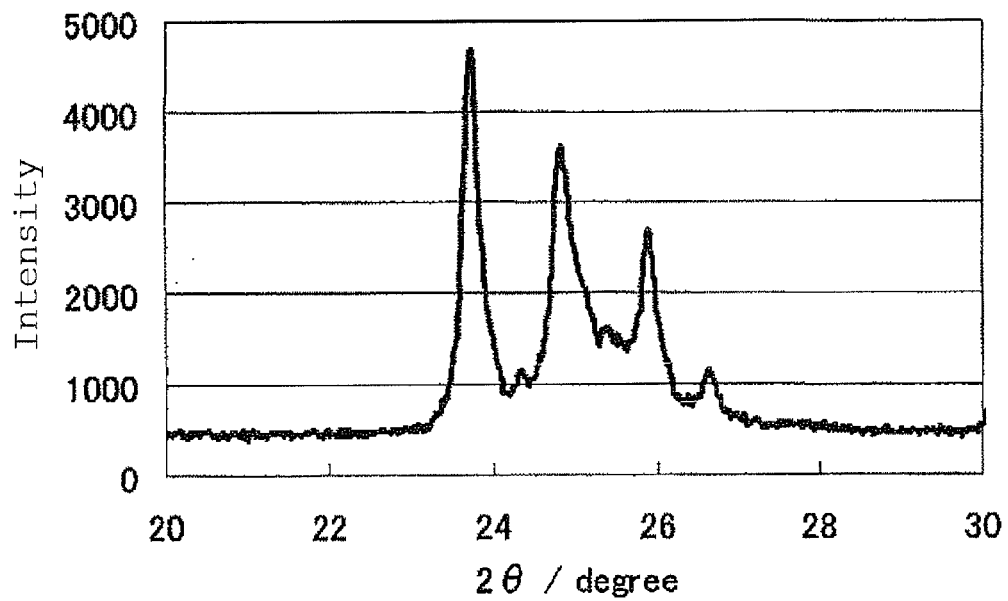
FIG. 6 is an enlarged view of the X-ray powder diffraction spectrum of the catalyst (2) in Example 2 at diffraction angles 2θ of 20° to 30°.

FIG. 5 shows an X-ray powder diffraction spectrum of the catalyst (2). FIG. 6 shows an enlarged view of the X-ray powder diffractione spectrum at diffraction angles 2θ of 20° to 30°. The X-ray powder diffraction spectrum indicated four diffraction peaks assigned to $Nb_{12}O_{29}$ skeletons and a diffraction peak due to $Nb_2O_5$ skeletons between diffraction angles 2θ of 23° to 28°. The intensity at the baseline, namely, the X-ray diffraction intensity at a diffraction angle 2θ of 22° was 444. The maximum X-ray diffraction intensity $I_1$ at diffraction angles 2θ of 25.45° to 25.65° was 1089. The maximum X-ray diffraction intensity $I_2$ at diffraction angles of 25.65° to 26.0° was 2290. The $I_2/(I_1+I_2)$ ratio was 0.68. The results of the elemental analysis of the catalyst (2) are set forth in Table 2.

2. Production of Fuel Cell Electrode

A fuel cell electrode (2) was produced in the same manner as in Example 1, except that the catalyst (2) was used.

3. Evaluation of Oxygen Reducing Ability

Figure 20:
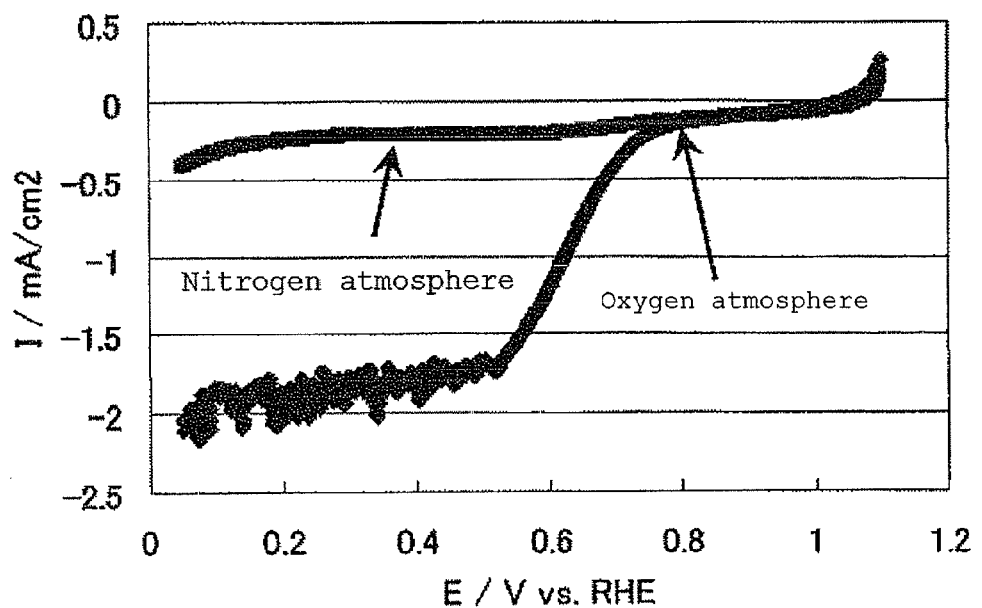
FIG. 20 is a graph showing an evaluation of the oxygen reducing ability of a fuel cell electrode (2) in Example 2.

The fuel cell electrode (2) was evaluated for oxygen reducing ability in the same manner as in Example 1. The current-potential curves recorded during the measurement are shown in FIG. 20.

The fuel cell electrode (2) manufactured in Example 2 had an oxygen reduction onset potential of 0.90 V (vs. NHE), and was found to have high oxygen reducing ability.

Example 3

1. Preparation of Catalyst

A niobium carbonitride (1) was prepared in the same manner as in Example 1. Subsequently, 0.50 g of the niobium carbonitride (1) was heated in a rotary kiln at 950° C. for 12 hours while passing equal amounts of an argon gas containing 1% by volume of oxygen gas and a nitrogen gas containing 4% by volume of hydrogen gas. As a result, a niobium-containing oxycarbonitride (hereinafter, also the catalyst (3)) was obtained.

Figure 7:
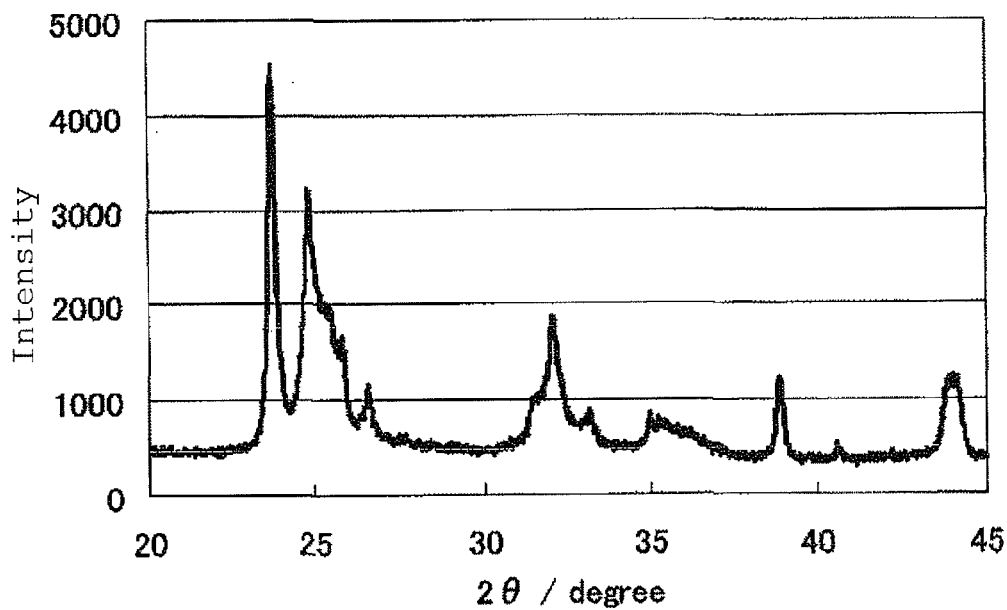
FIG. 7 is an X-ray powder diffraction spectrum of a catalyst (3) in Example 3.
Figure 8:
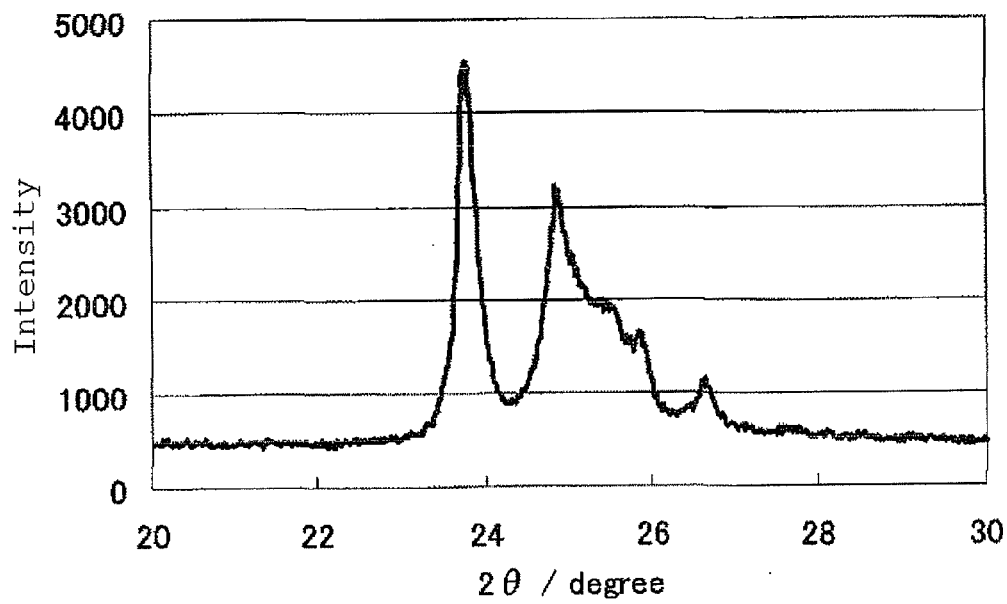
FIG. 8 is an enlarged view of the X-ray powder diffraction spectrum of the catalyst (3) in Example 3 at diffraction angles 2θ of 20° to 30°.

FIG. 7 shows an X-ray powder diffraction spectrum of the catalyst (3). FIG. 8 shows an enlarged view of the X-ray powder diffraction spectrum at diffraction angles 2θ of 20° to 30°. The X-ray powder diffraction spectrum indicated four diffraction peaks assigned to $Nb_{12}O_{29}$ skeletons and a diffraction peak due to $Nb_2O_5$ skeletons between diffraction angles 2θ of 23° to 28°. The intensity at the baseline, namely, the X-ray diffraction intensity at a diffraction angle 2θ of 22° was 436. The maximum X-ray diffraction intensity $I_1$ at diffraction angles 2θ of 25.45° to 25.65° was 1480. The maximum X-ray diffraction intensity $I_2$ at diffraction angles of 25.65° to 26.0° was 1204. The $I_2/(I_1+I_2)$ ratio was 0.45. The results of the elemental analysis of the catalyst (3) are set forth in Table 2.

2. Production of Fuel Cell Electrode

A fuel cell electrode (3) was produced in the same manner as in Example 1, except that the catalyst (3) was used.

3. Evaluation of Oxygen Reducing Ability

Figure 21:
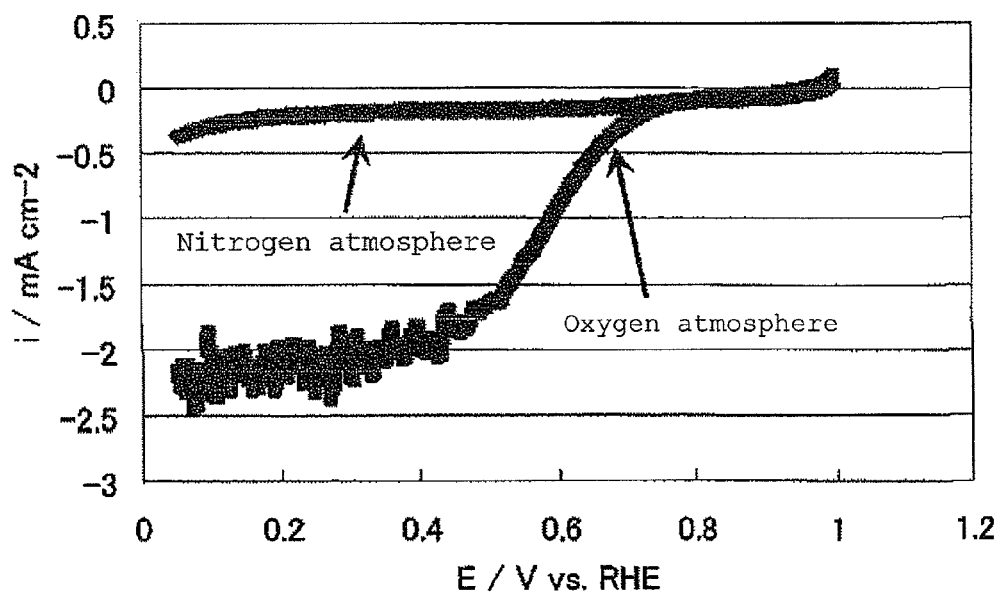
FIG. 21 is a graph showing an evaluation of the oxygen reducing ability of a fuel cell electrode (3) in Example 3.

The fuel cell electrode (3) was evaluated for oxygen reducing ability in the same manner as in Example 1. The current-potential curves recorded during the measurement are shown in FIG. 21.

The fuel cell electrode (3) manufactured in Example 3 had an oxygen reduction onset potential of 0.91 V (vs. NHE), and was found to have high oxygen reducing ability.

Example 4

1. Preparation of Catalyst

A niobium carbonitride (1) was prepared in the same manner as in Example 1. Subsequently, 0.50 g of the niobium carbonitride (1) was heated in a rotary kiln at 950° C. for 15 hours while passing equal amounts of an argon gas containing 1% by volume of oxygen gas and a nitrogen gas containing 4% by volume of hydrogen gas. As a result, a niobium-containing oxycarbonitride (hereinafter, also the catalyst (4)) was obtained.

Figure 9:
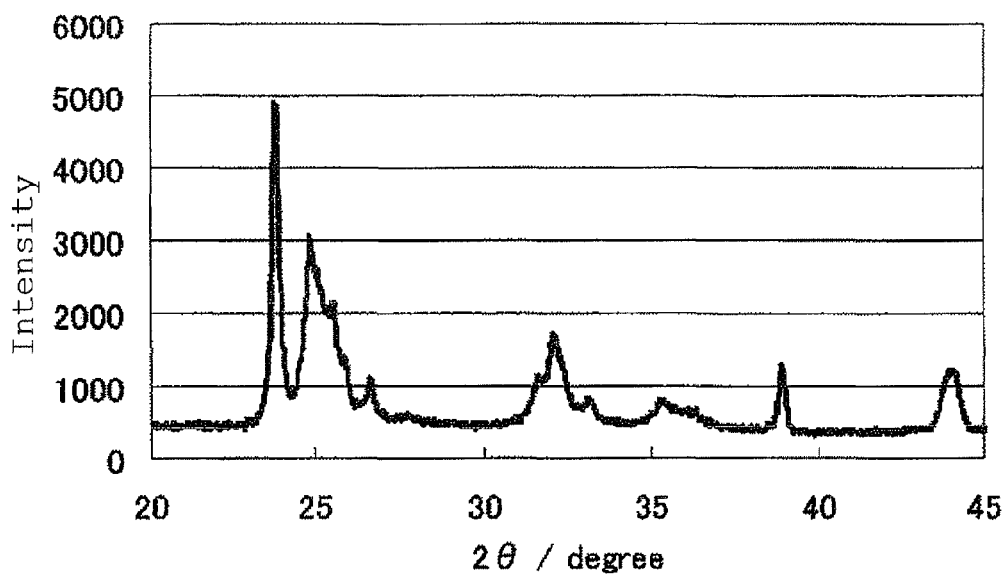
FIG. 9 is an X-ray powder diffraction spectrum of a catalyst (4) in Example 4.
Figure 10:
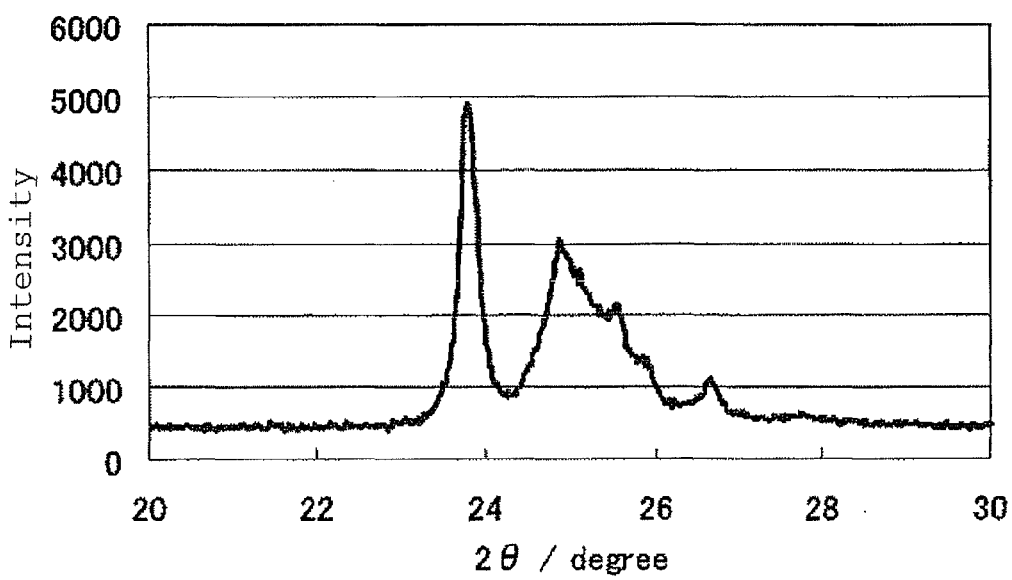
FIG. 10 is an enlarged view of the X-ray powder diffraction spectrum of the catalyst (4) in Example 4 at diffraction angles 2θ of 20° to 30°.

FIG. 9 shows an X-ray powder diffraction spectrum of the catalyst (4). FIG. 10 shows an enlarged view of the X-ray powder diffraction spectrum at diffraction angles 2θ of 20° to 30°. The X-ray powder diffraction spectrum indicated four diffraction peaks assigned to $Nb_{12}O_{29}$ skeletons and a diffraction peak due to $Nb_2O_5$ skeletons between diffraction angles 2θ of 23° to 28°. The intensity at the baseline, namely, the X-ray diffraction intensity at a diffraction angle 2θ of 22° was 486. The maximum X-ray diffraction intensity $I_1$ at diffraction angles 2θ of 25.45° to 25.65° was 1665. The maximum X-ray diffraction intensity $I_2$ at diffraction angles of 25.65° to 26.0° was 896. The $I_2/(I_1+I_2)$ ratio was 0.35. The results of the elemental analysis of the catalyst (4) are set forth in Table 2.

2. Production of Fuel Cell Electrode

A fuel cell electrode (4) was produced in the same manner as in Example 1, except that the catalyst (4) was used.

3. Evaluation of Oxygen Reducing Ability

Figure 22:
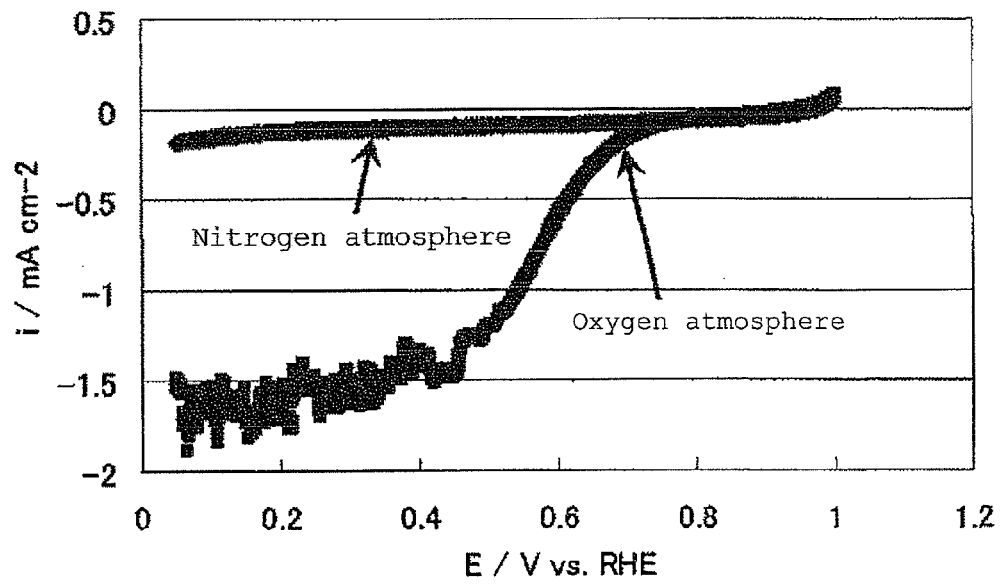
FIG. 22 is a graph showing an evaluation of the oxygen reducing ability of a fuel cell electrode (4) in Example 4.

The fuel cell electrode (4) was evaluated for oxygen reducing ability in the same manner as in Example 1. The current-potential curves recorded during the measurement are shown in FIG. 22.

The fuel cell electrode (4) manufactured in Example 4 had an oxygen reduction onset potential of 0.80 V (vs. NHE).

From the oxygen reduction onset potentials and the X-ray powder diffraction spectra obtained in Examples 1 to 4, it can be considered that the oxygen reducing ability lowers with increasing proportion of the $Nb_2O_5$ skeletons in the niobium-containing oxycarbonitride.

Figure 27:
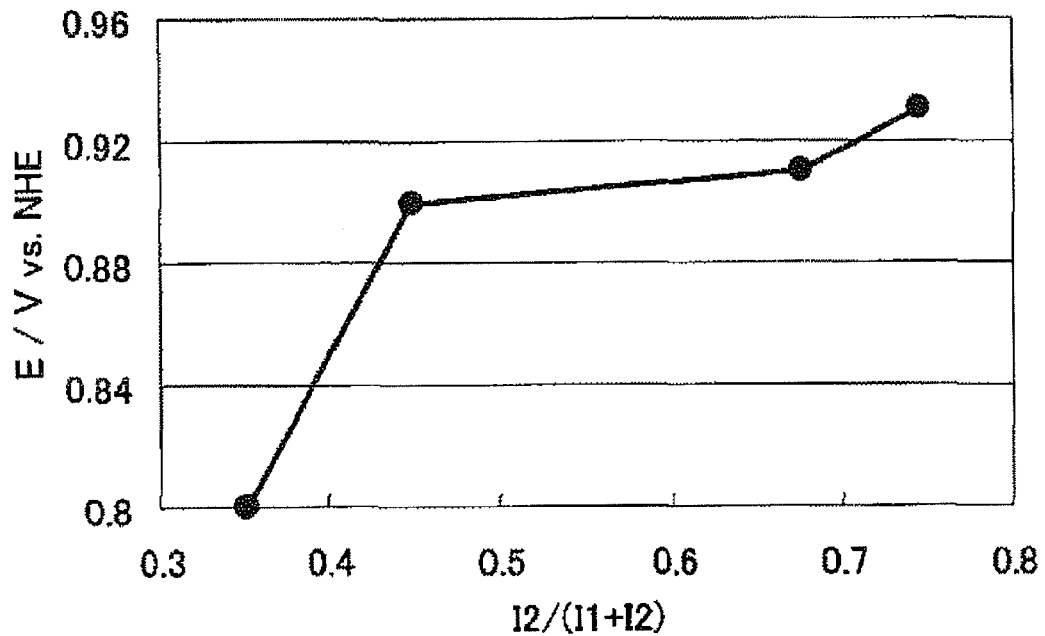
FIG. 27 is a graph that shows a relation between $I_2/(I_1+I_2)$ in the X-ray powder diffractometry spectra of the catalysts and the oxygen reduction onset potential of the electrodes prepared with the catalysts.
Figure 28:
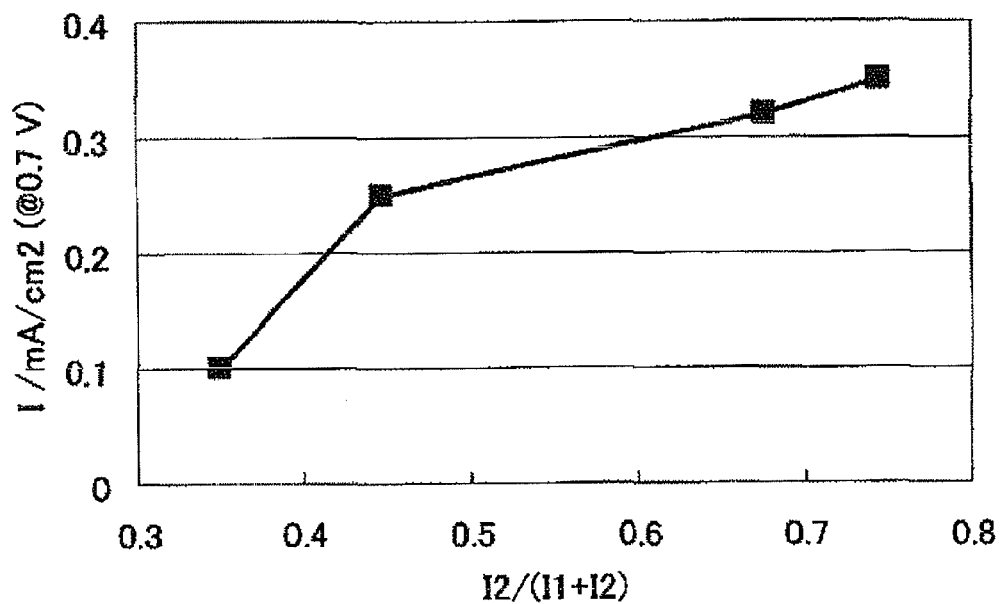
FIG. 28 is a graph that shows a relation between $I_2/(I_1+I_2)$ in the X-ray powder diffractometry spectra of the catalysts and the oxygen reduction current of the electrodes prepared with the catalysts.

FIG. 27 shows a relation between $I_2/(I_1+I_2)$ in the X-ray powder diffractometry spectra of the catalysts and the oxygen reduction onset potential of the electrodes obtained with the catalysts. FIG. 28 shows a relation between $I_2/(I_1+I_2)$ in the X-ray powder diffractometry spectra of the catalysts and the oxygen reduction current (the difference between the reduction current under oxygen atmosphere and that under nitrogen atmosphere at 0.7 V) of the electrodes obtained with the catalysts. These graphs show that the $I_2/(I_1+I_2)$ ratio is correlated with the oxygen reducing ability. In detail, it has been found that the oxygen reducing ability increases with increasing ratio of the maximum X-ray diffraction intensity $I_2$ assigned to the $Nb_{12}O_{29}$ skeletons at diffraction angles 2θ of 25.65° to 26.0°.

Example 5

1. Preparation of Catalyst 5.88 g (56 mmol) of niobium carbide (NbC manufactured by SOEKAWA CHEMICAL CO., LTD.), 0.87 g (5 mmol) of iron acetate (Fe(CH$_3$CO$_2$)$_2$ manufactured by ALDRICH) and 5.14 g (48 mmol) of niobium nitride (NbN manufactured by KOJUNDO CHEMICAL LABORATORY CO., LTD.) were sufficiently crushed and mixed together. The resultant powder mixture was heated in a tubular furnace in a nitrogen atmosphere at 1600° C. for 3 hours to give 10.89 g of a carbonitride (2) containing iron and niobium. Because the carbonitride (2) would form a sintered product, it was crushed in a mortar.

Subsequently, 0.50 g of the carbonitride (2) was heated in a rotary kiln at 950° C. for 8 hours while passing equal amounts of an argon gas containing 1l by volume of oxygen gas and a nitrogen gas containing 4l by volume of hydrogen gas. As a result, an oxycarbonitride containing niobium and iron (hereinafter, also the catalyst (5)) was obtained.

Figure 11:
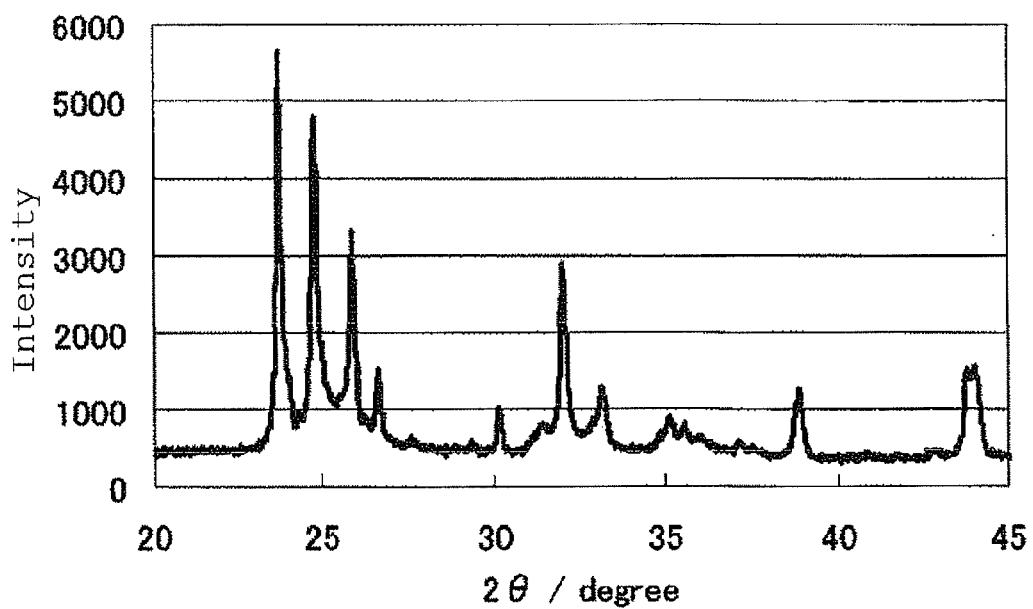
FIG. 11 is an X-ray powder diffraction spectrum of a catalyst (5) in Example 5.
Figure 12:
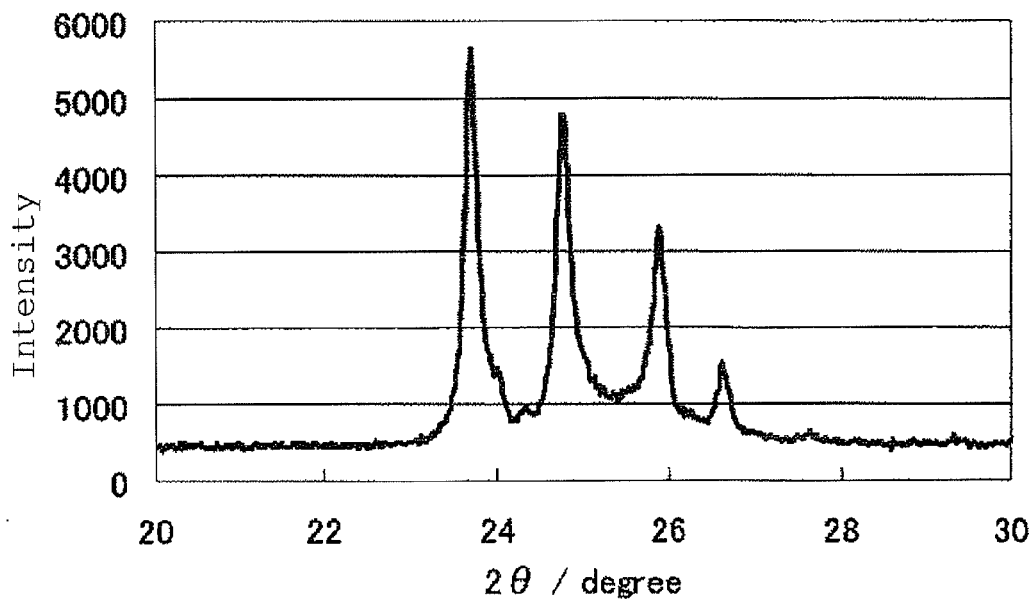
FIG. 12 is an enlarged view of the X-ray powder diffraction spectrum of the catalyst (5) in Example 5 at diffraction angles 2θ of 20° to 30°.

FIG. 11 shows an X-ray powder diffraction spectrum of the catalyst (5). FIG. 12 shows an enlarged view of the X-ray powder diffraction spectrum at diffraction angles 2θ of 20° to 30°. The X-ray powder diffraction spectrum indicated four diffraction peaks assigned to Nb$_{12}$O$_{29}$ skeletons between diffraction angles 2θ of 23° to 28°. The intensity at the baseline, namely, the X-ray diffraction intensity at a diffraction angle 2θ of 22° was 480. The maximum X-ray diffraction intensity I$_1$ at diffraction angles 2θ of 25.45° to 25.65° was 680. The maximum X-ray diffraction intensity I$_2$ at diffraction angles of 25.65° to 26.0° was 2839. The I$_2$/(I$_1$+I$_2$) ratio was 0.81. The results of the elemental analysis of the catalyst (5) are set forth in Table 2.

2. Production of Fuel Cell Electrode

A fuel cell electrode (5) was produced in the same manner as in Example 1, except that the catalyst (5) was used.

3. Evaluation of Oxygen Reducing Ability

Figure 23:
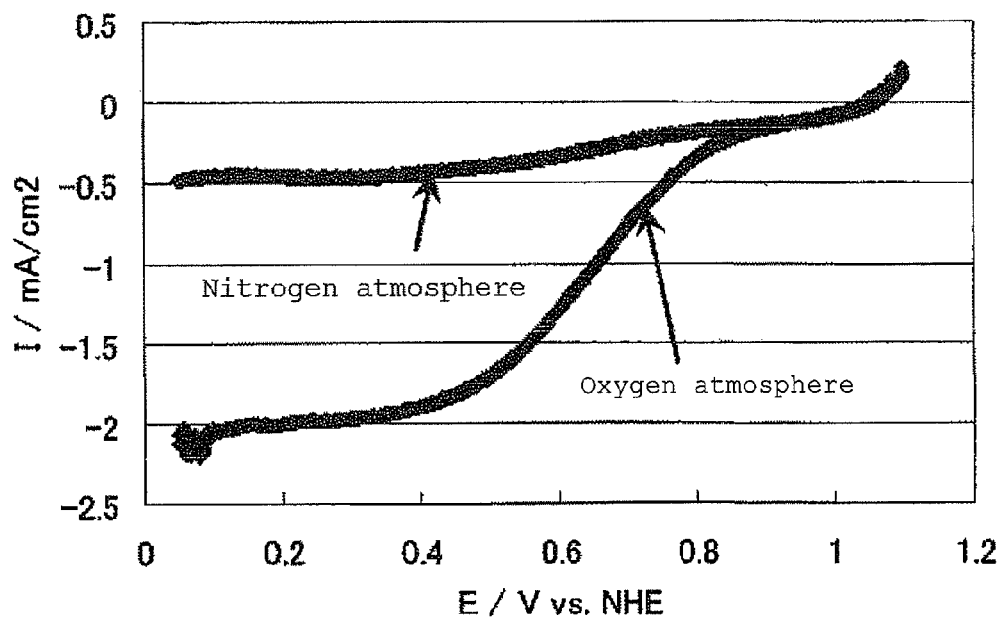
FIG. 23 is a graph showing an evaluation of the oxygen reducing ability of a fuel cell electrode (5) in Example 5.

The fuel cell electrode (5) was evaluated for oxygen reducing ability in the same manner as in Example 1. The current-potential curves recorded during the measurement are shown in FIG. 23.

The fuel cell electrode (5) manufactured in Example 5 had an oxygen reduction onset potential of 0.95 V (vs. NHE), and was found to have high oxygen reducing ability.

Comparative Example 1

1. Preparation of Catalyst

Commercially available Nb$_2$O$_5$ (manufactured by KOJUNDO CHEMICAL LABORATORY CO., LTD.) was used as a catalyst (hereinafter, also the catalyst (6)).

Figure 13:
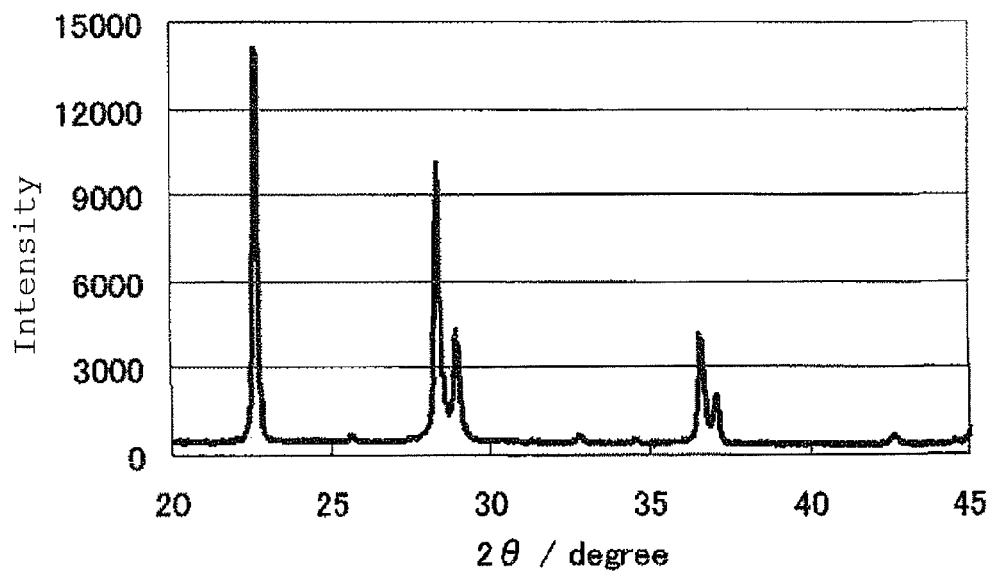
FIG. 13 is an X-ray powder diffraction spectrum of a catalyst (6) in Comparative Example 1.
Figure 14:
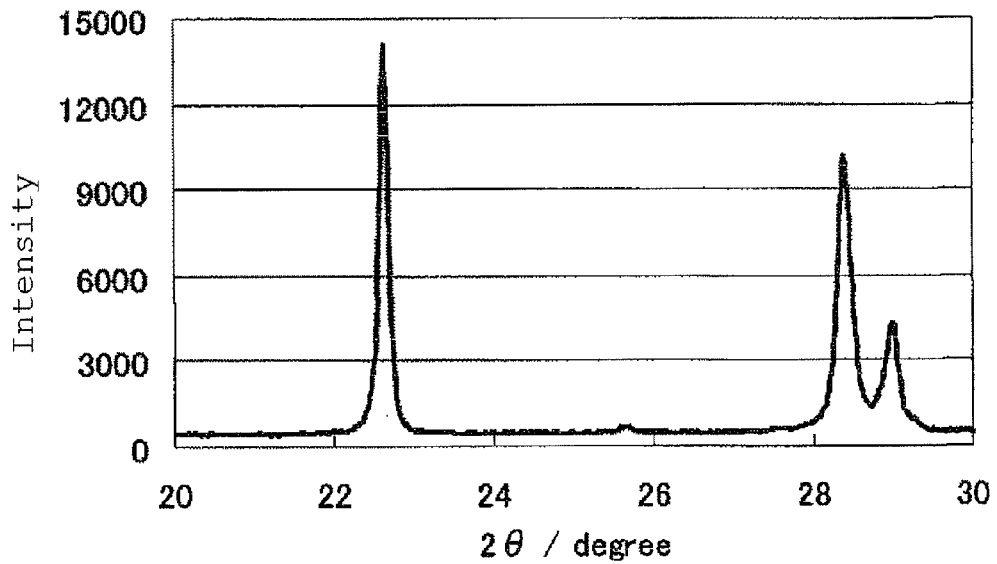
FIG. 14 is an enlarged view of the X-ray powder diffraction spectrum of the catalyst (6) in Comparative Example 1 at diffraction angles 2θ of 20° to 30°.

FIG. 13 shows an X-ray powder diffraction spectrum of the catalyst (6). FIG. 14 shows an enlarged view of the X-ray powder diffraction spectrum at diffraction angles 2θ of 20° to 30°. The X-ray powder diffraction spectrum indicated diffraction peaks assigned to Nb$_2$O$_5$ skeletons between diffraction angles 2θ of 20° to 30°. The intensity at the baseline, namely, the X-ray diffraction intensity at a diffraction angle 2θ of 22° was 474. The maximum X-ray diffraction intensity I$_1$ at diffraction angles 2θ of 25.45° to 25.65° was 894. The maximum X-ray diffraction intensity I$_2$ at diffraction angles of 25.65° to 26.0° was 62. The I$_2$/(I$_1$+I$_2$) ratio was 0.06.

2. Production of Fuel Cell Electrode

A fuel cell electrode (6) was produced in the same manner as in Example 1, except that the catalyst (6) was used.

3. Evaluation of Oxygen Reducing Ability

Figure 24:
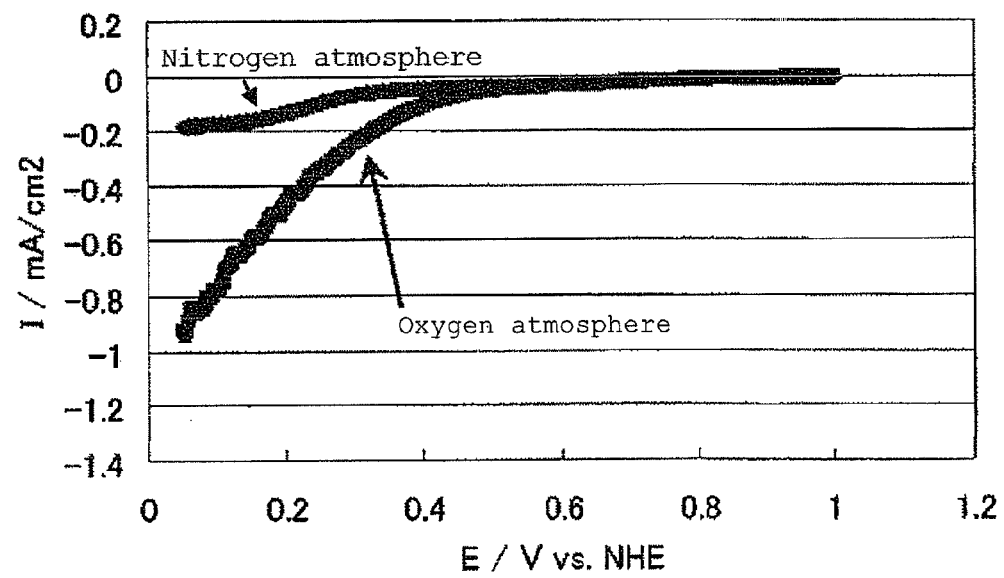
FIG. 24 is a graph showing an evaluation of the oxygen reducing ability of a fuel cell electrode (6) in Comparative Example 1.

The fuel cell electrode (6) was evaluated for oxygen reducing ability in the same manner as in Example 1. The current-potential curves recorded during the measurement are shown in FIG. 24.

The fuel cell electrode (6) manufactured in Comparative Example 1 had an oxygen reduction onset potential of 0.63 V (vs. NHE), and was found to have low oxygen reducing ability.

Comparative Example 2

1. Preparation of Catalyst

Nb$_2$O$_5$ was reduced to Nb$_{12}$O$_{29}$ (hereinafter, also the catalyst (7)) in accordance with the production method described in Nonpatent Literature 1.

Figure 15:
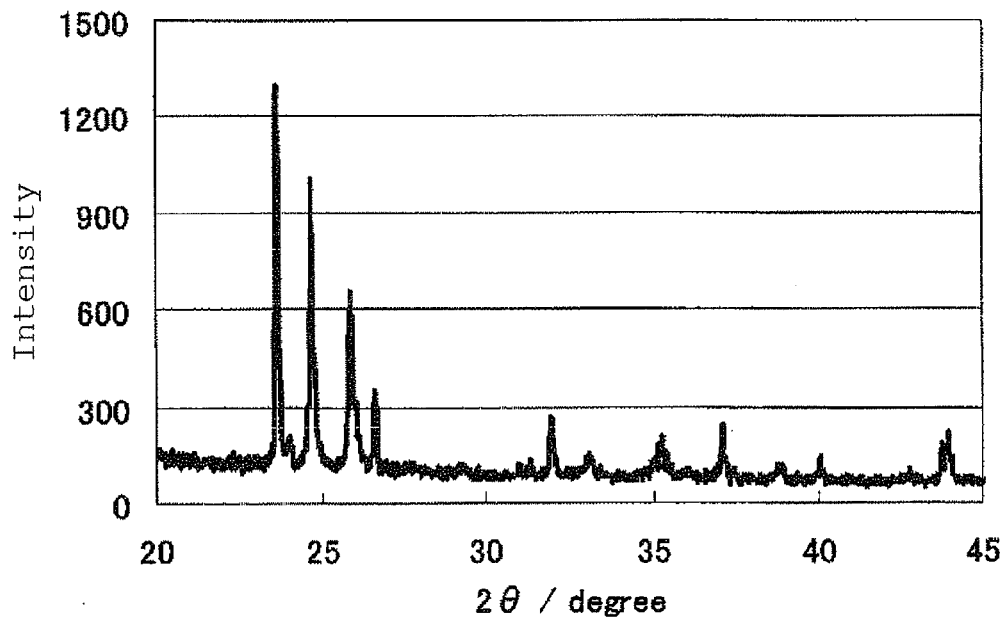
FIG. 15 is an X-ray powder diffraction spectrum of a catalyst (7) in Comparative Example 2.
Figure 16:
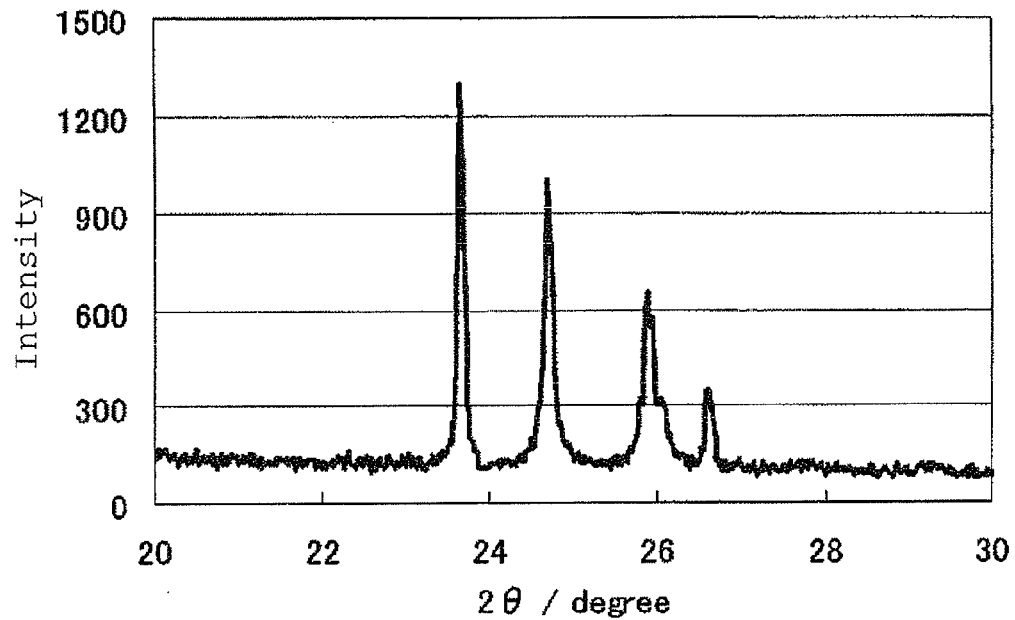
FIG. 16 is an enlarged view of the X-ray powder diffraction spectrum of the catalyst (7) in Comparative Example 2 at diffraction angles 2θ of 20° to 30°.

FIG. 15 shows an X-ray powder diffraction spectrum of the catalyst (7). FIG. 16 shows an enlarged view of the X-ray powder diffraction spectrum at diffraction angles 2θ of 20° to 30°. The X-ray powder diffraction spectrum indicated four diffraction peaks assigned to Nb$_{12}$O$_{29}$ skeletons between diffraction angles 2θ of 23° to 28°. The intensity at the baseline, namely, the X-ray diffraction intensity at a diffraction angle 2θ of 22° was 106. The maximum X-ray diffraction intensity I$_1$ at diffraction angles 2θ of 25.45° to 25.65° was 38. The maximum X-ray diffraction intensity I$_2$ at diffraction angles of 25.65° to 26.0° was 552. The I$_2$/(I$_1$+I$_2$) ratio was 0.94.

2. Production of Fuel Cell Electrode

A fuel cell electrode (7) was produced in the same manner as in Example 1, except that the catalyst (7) was used.

3. Evaluation of Oxygen Reducing Ability

Figure 25:
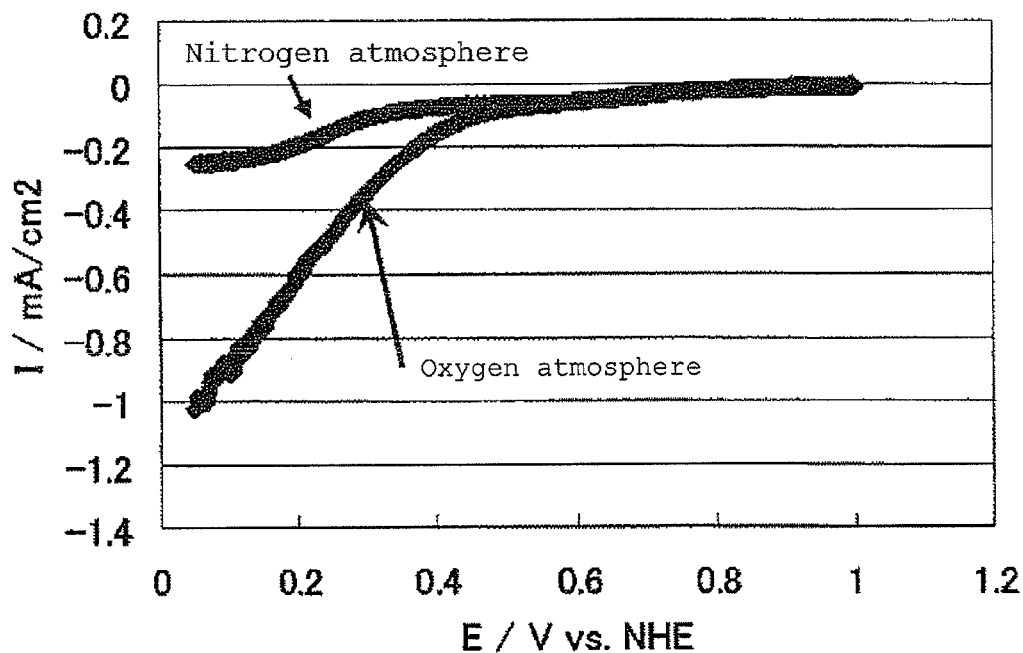
FIG. 25 is a graph showing an evaluation of the oxygen reducing ability of a fuel cell electrode (7) in Comparative Example 2.

The fuel cell electrode (7) was evaluated for oxygen reducing ability in the same manner as in Example 1. The current-potential curves recorded during the measurement are shown in FIG. 25.

The fuel cell electrode (7) manufactured in Comparative Example 2 had an oxygen reduction onset potential of 0.60 V (vs. NHE), and was found to have low oxygen reducing ability similarly to the catalyst (6).

The results in Examples 1 to 5 and Comparative Examples 1 and 2 showed that the catalysts achieved higher oxygen reducing ability when the niobium-containing oxycarbonitride was obtained by heating the niobium-containing carbonitride in an inert gas containing oxygen gas.

Comparative Example 3

1. Preparation of Catalyst

A niobium carbonitride (1) was prepared in the same manner as in Example 1. Subsequently, 0.50 g of the niobium carbonitride (1) was heated in a rotary kiln at 950° C. for 25 hours while passing equal amounts of an argon gas containing 1% by volume of oxygen gas and a nitrogen gas containing 4% by volume of hydrogen gas. As a result, a niobium-containing oxycarbonitride (hereinafter, also the catalyst (8)) was obtained.

Figure 17:
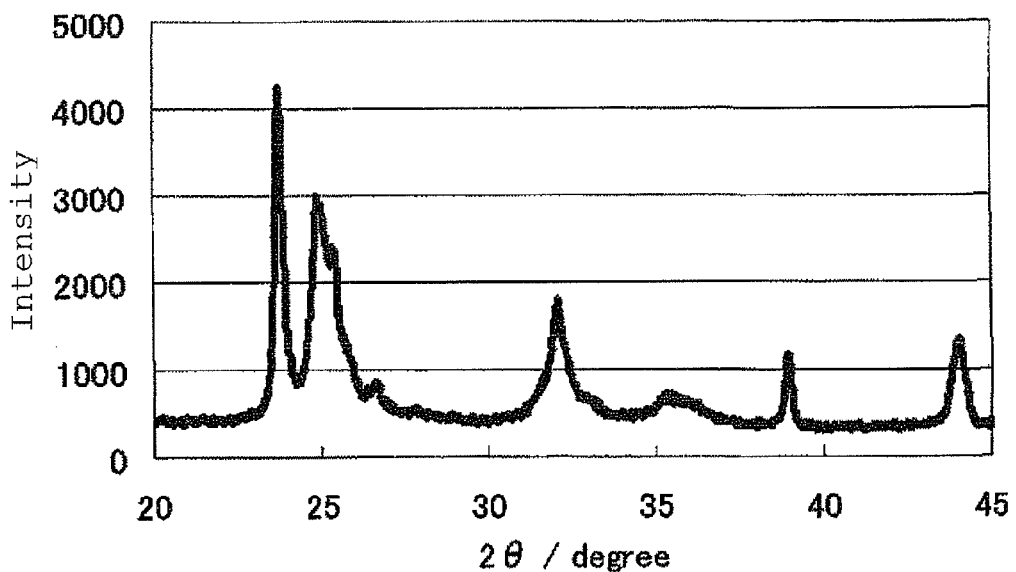
FIG. 17 is an X-ray powder diffraction spectrum of a catalyst (8) in Comparative Example 3.
Figure 18:
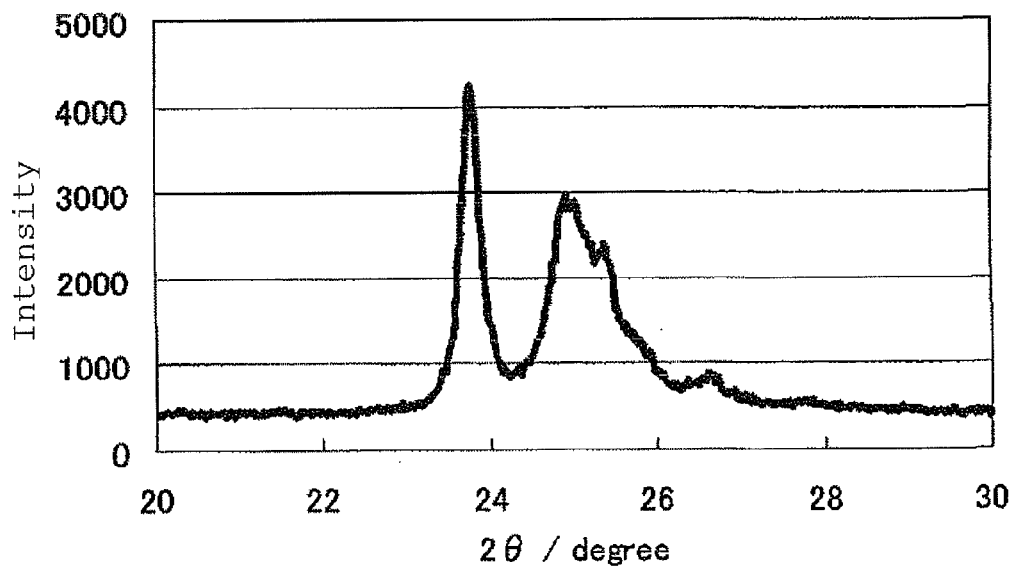
FIG. 18 is an enlarged view of the X-ray powder diffraction spectrum of the catalyst (8) in Comparative Example 3 at diffraction angles 2θ of 20° to 30°.

FIG. 17 shows an X-ray powder diffraction spectrum of the catalyst (8). FIG. 18 shows an enlarged view of the X-ray powder diffraction spectrum at diffraction angles 2θ of 20° to 30°. The X-ray powder diffraction spectrum indicated four diffraction peaks assigned to Nb$_{12}$O$_{29}$ skeletons and a diffraction peak due to Nb$_2$O$_5$ skeletons between diffraction angles 2θ of 23° to 28°. The intensity at the baseline, namely, the X-ray diffraction intensity at a diffraction angle 2θ of 22° was 443. The maximum X-ray diffraction intensity I$_1$ at diffraction angles 2θ of 25.45° to 25.65° was 2201. The maximum X-ray diffraction intensity $I_2$ at diffraction angles of 25.65° to 26.0° was 697. The $I_2/(I_1+I_2)$ ratio was 0.24.

The results of the elemental analysis of the catalyst (8) are set forth in Table 2.

2. Production of Fuel Cell Electrode

A fuel cell electrode (8) was produced in the same manner as in Example 1, except that the catalyst (8) was used.

3. Evaluation of Oxygen Reducing Ability

Figure 26:
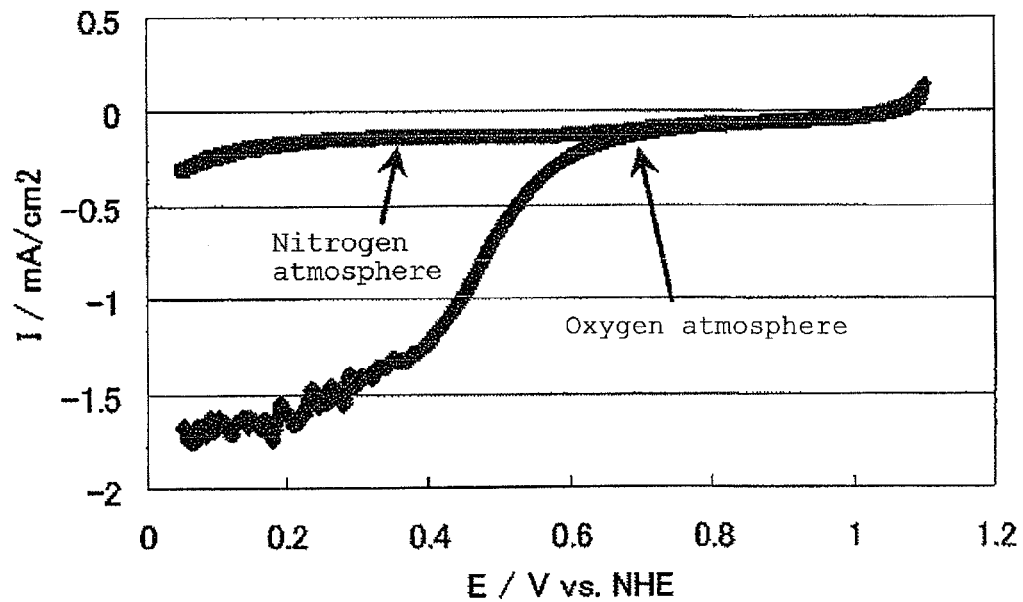
FIG. 26 is a graph showing an evaluation of the oxygen reducing ability of a fuel cell electrode (8) in Comparative Example 3.

The fuel cell electrode (8) was evaluated for oxygen reducing ability in the same manner as in Example 1. The current-potential curves recorded during the measurement are shown in FIG. 26.

The fuel cell electrode (8) manufactured in Comparative Example 3 had an oxygen reduction onset potential of 0.65 V (vs. NHE).

TABLE 1

Results of elemental analysis of niobium carbonitride (% by mass (The numbers in parentheses indicate the ratio of the numbers of the atoms.))

| Materials | Nb | C | N | O | Composition |
|---|---|---|---|---|---|
| Ex. 1 NbC + NbO$_2$ + NbN | 87.6 (1) | 5.97 (0.52) | 6.39 (0.48) | 0 (0) | NbC$_{0.52}$N$_{0.48}$ |

TABLE 2

Results of elemental analysis of catalysts (% by mass (The numbers in parentheses indicate the ratio of the numbers of the atoms.))

| | Nb | Metal | C | N | O | Composition |
|---|---|---|---|---|---|---|
| Ex. 1 | 71.4 (1) | — | 3.5 (0.38) | 1.1 (0.10) | 24 (1.9) | NbC$_{0.38}$N$_{0.10}$O$_{1.9}$ |
| Ex. 2 | 69.6 (1) | — | 2.6 (0.28) | 0.8 (0.07) | 27 (2.2) | NbC$_{0.28}$N$_{0.07}$O$_{2.2}$ |
| Ex. 3 | 69.7 (1) | — | 1.9 (0.21) | 0.4 (0.04) | 28 (2.3) | NbC$_{0.21}$N$_{0.04}$O$_{2.3}$ |
| Ex. 4 | 68.5 (1) | — | 1.3 (0.15) | 0.2 (0.02) | 30 (2.5) | NbC$_{0.15}$N$_{0.02}$O$_{2.5}$ |
| Ex. 5 | 67.2 (0.95) | Fe: 2.1 (0.05) | 3.2 (0.35) | 0.7 (0.07) | 27 (2.2) | Nb$_{0.95}$Fe$_{0.05}$C$_{0.35}$N$_{0.07}$O$_{2.2}$ |
| Comp. Ex. 3 | 67.8 (1) | — | 1.1 (0.12) | 0.1 (0.01) | 31 (2.6) | NbC$_{0.12}$N$_{0.01}$O$_{2.6}$ |

INDUSTRIAL APPLICABILITY

The catalysts of the present invention are not corroded in acidic electrolytes or at high potential and have excellent durability and high oxygen reducing ability. They are therefore suitably used in fuel cell catalyst layers, electrodes, electrode assemblies and fuel cells.

The invention claimed is:

1. An electrode comprising a fuel cell catalyst layer and a porous support layer, wherein the fuel cell catalyst layer comprises a catalyst which comprises a niobium-containing oxycarbonitride having $I_2/(I_1+I_2)$ of not less than 0.25 wherein $I_1$ is the maximum X-ray diffraction intensity at diffraction angles 2θ of 25.45° to 25.65° and $I_2$ is the maximum X-ray diffraction intensity at diffraction angles 2θ of 25.65° to 26.0° according to X-ray powder diffractometry (Cu—Kα radiation).

2. A membrane electrode assembly comprising a cathode, an anode and an electrolyte membrane interposed between the cathode and the anode, wherein the cathode and/or the anode is the electrode described in claim 1.

3. A fuel cell comprising the membrane electrode assembly described in claim 2.

4. A polymer electrolyte fuel cell comprising the membrane electrode assembly described in claim 2.

5. The electrode according to claim 1, wherein the niobium-containing oxycarbonitride has a compositional formula represented by NbC$_x$N$_y$O$_z$ (wherein x, y and z represent a ratio of numbers of the atoms, 0.01≤x≤2, 0.01≤y≤2, 0.01≤z≤3, and x+y+z≤5).

6. The electrode according to claim 1, wherein the niobium-containing oxycarbonitride contains, in addition to niobium, at least one metal (hereinafter the "metal M" or "M") selected from the group consisting of tin, indium, platinum, tantalum, zirconium, copper, iron, tungsten, chromium, molybdenum, hafnium, titanium, vanadium, cobalt, manganese, cerium, gold, silver, iridium, palladium, yttrium, ruthenium and nickel.

7. The electrode according to claim 6, wherein the niobium-containing oxycarbonitride has a compositional formula represented by Nb$_a$M$_b$C$_x$N$_y$O$_z$ (wherein M is the metal M, a, b, x, y and z represent a ratio of the numbers of the atoms, 0.01≤a<1, 0≤b≤0.99, 0.01≤x≤2, 0.01≤y≤2, 0.01≤z≤3, a+b=1, and x+y+z≤5).

8. The electrode according to claim 1, wherein the fuel cell catalyst layer further comprises electron conductive particles.

9. A process for producing the electrode of claim 1, which comprises a step of producing the catalyst by a process comprising a step of obtaining the niobium-containing oxycarbonitride by heating a niobium-containing carbonitride in an inert gas containing oxygen gas.

10. The process for producing the electrode according to claim 9, wherein the heating is performed at a temperature in the range of 600 to 1200° C. and the inert gas has an oxygen gas concentration in the range of 0.1 to 5% by volume.

11. The process for producing the electrode according to claim 9, wherein the inert gas contains hydrogen gas at not more than 4% by volume.

* * * * *